(12) United States Patent
Lee et al.

(10) Patent No.: US 8,238,986 B2
(45) Date of Patent: Aug. 7, 2012

(54) TILT-TYPE SLIDING MODULE FOR MOBILE PHONE AND TERMINAL HOLDER USING THE SAME

(75) Inventors: Seong-Jun Lee, Gyeonggi-do (KR);
Sang-Wha Park, Gyeonggi-do (KR);
Jeong-Min Park, Gyeonggi-do (KR);
Han-Gyu Hwang, Seoul (KR);
Sung-Ho Ahn, Seoul (KR)

(73) Assignees: Samsung Electronics Co., Ltd., Samsung-ro, Yeongtong-gu, Suwon-si, Gyeonggi-do (KR); Satec co. Ltd., Sangrok-Gu, Ansan-Si, Gyeonggi-Do (KR)

( * ) Notice: Subject to any disclaimer, the term of this patent is extended or adjusted under 35 U.S.C. 154(b) by 0 days.

(21) Appl. No.: 13/146,285

(22) PCT Filed: Dec. 26, 2009

(86) PCT No.: PCT/KR2009/007816
§ 371 (c)(1),
(2), (4) Date: Jul. 26, 2011

(87) PCT Pub. No.: WO2010/093117
PCT Pub. Date: Aug. 19, 2010

(65) Prior Publication Data
US 2011/0287819 A1    Nov. 24, 2011

(30) Foreign Application Priority Data

Feb. 12, 2009   (KR) .................. 10-2009-0011639
Apr. 22, 2009   (KR) .................. 10-2009-0035266

(51) Int. Cl.
*H04W 88/02* (2009.01)
(52) U.S. Cl. .................. 455/575.4; 248/274.1; 396/448
(58) Field of Classification Search ............... 455/575.4, 455/556.1, 575.1, 550.1; 248/274.1, 580, 248/602; 396/448; 361/600
See application file for complete search history.

(56) References Cited

U.S. PATENT DOCUMENTS 6,980,840 B2 * 12/2005 Kim et al. .................. 455/575.4
7,630,744 B2 * 12/2009 Lee ............................ 455/575.4

FOREIGN PATENT DOCUMENTS

| JP | 2007-074411 | 3/2007 |
| KR | 20-0385468 | 5/2005 |
| KR | 2006-073085 | 6/2006 |
| KR | 2009-013427 | 2/2009 |

* cited by examiner

*Primary Examiner* — Phuoc Doan
(74) *Attorney, Agent, or Firm* — Cha & Reiter, LLC

(57) ABSTRACT

Provided are a tilt-type sliding module for a mobile phone and a terminal holder using the tilt-type sliding module, which enable a display unit of the mobile phone to perform a planar sliding motion and at the same time, to perform a tilt motion for inclining upwardly, thereby providing optimal convenience according to a user's purpose. The tilt-type sliding module allows a stable tilt motion of the display unit of the mobile phone by means of: a control bracket for controlling a rotation motion of a tilt rotation portion formed on each of both ends of a frame and a rotation motion and a lock motion of the tilt rotation portion by being fixedly coupled to an intermediate member of the mobile phone; a stopper shaft; and a spring ball.

15 Claims, 25 Drawing Sheets

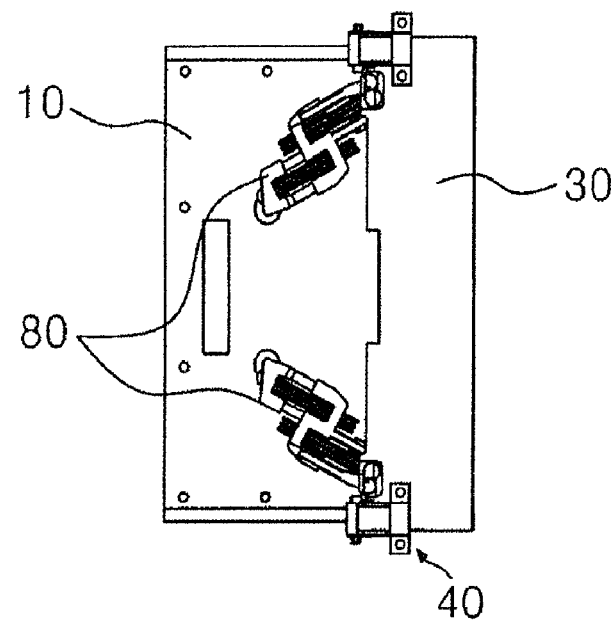
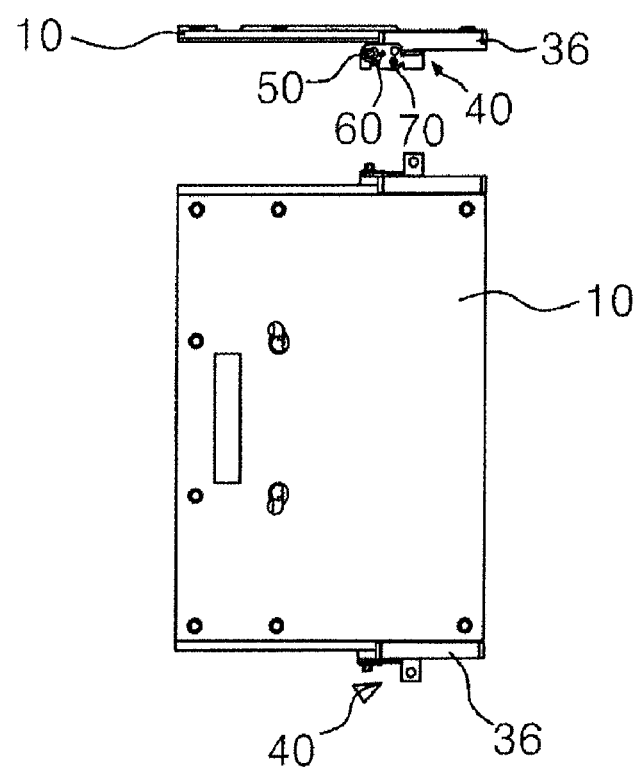
FIG.2

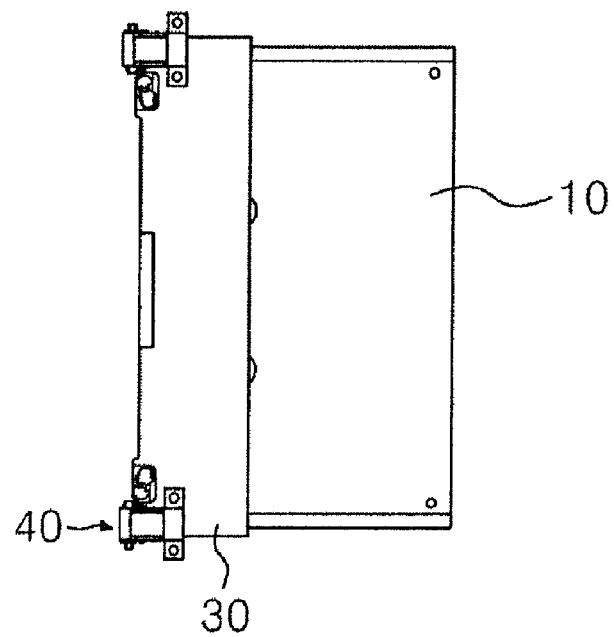
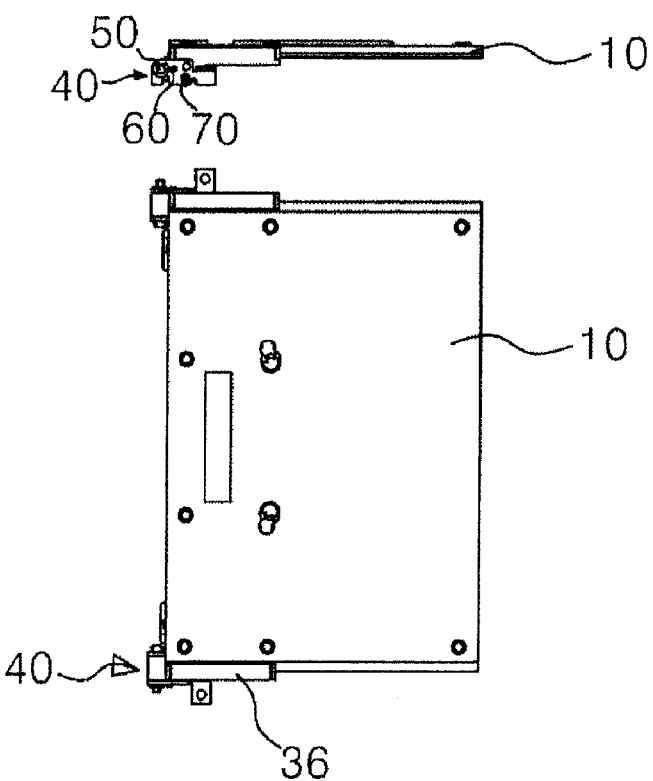
FIG.3

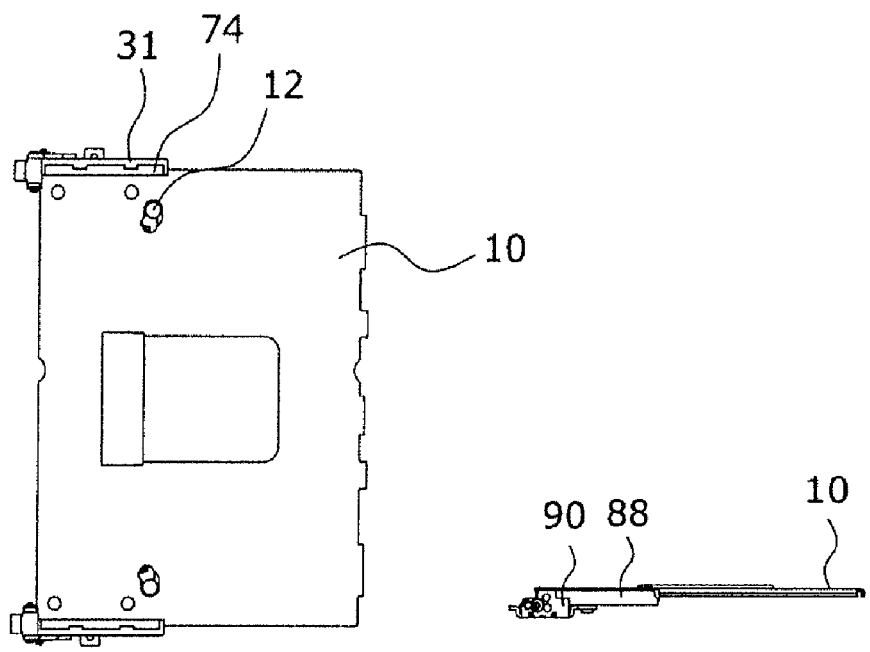
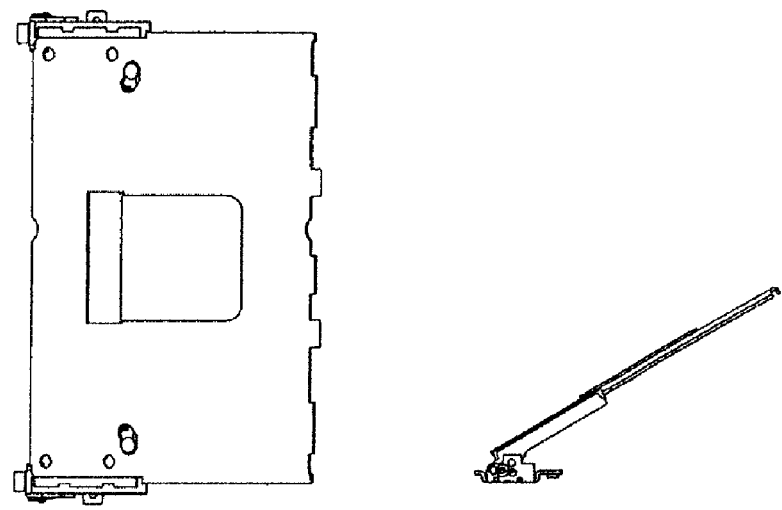
FIG.11A    FIG.11B
FIG.11C    FIG.11D

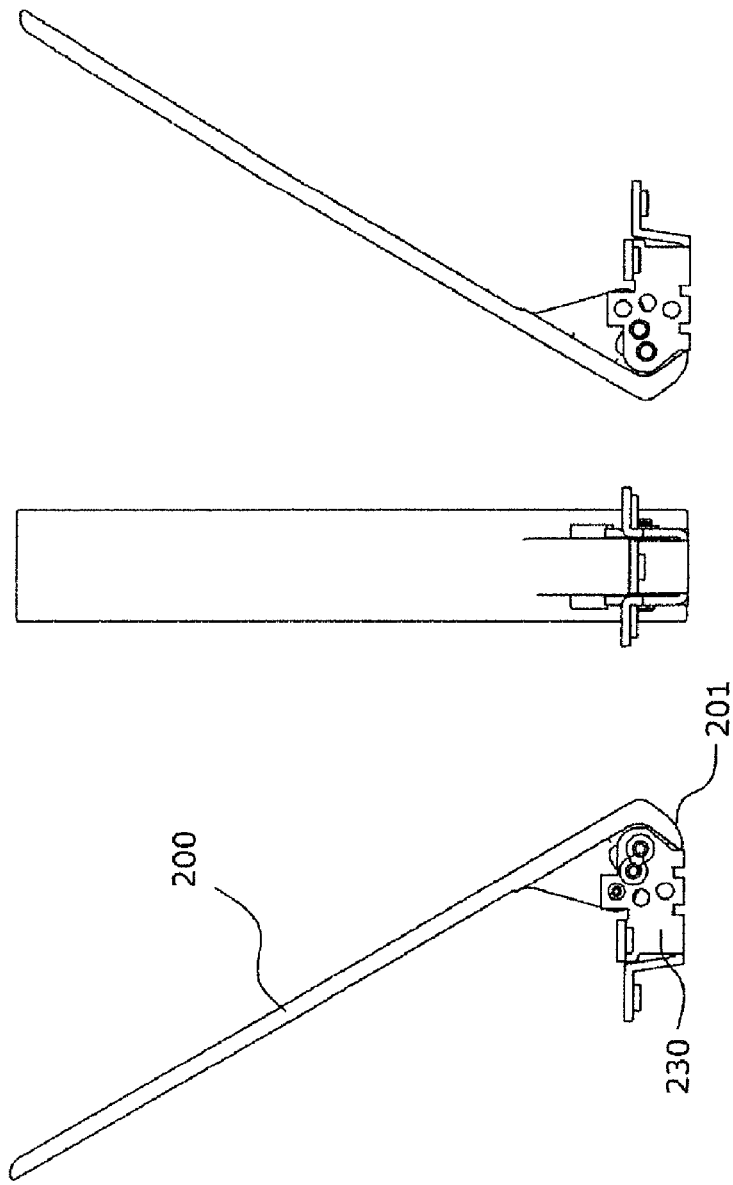

TILT-TYPE SLIDING MODULE FOR MOBILE PHONE AND TERMINAL HOLDER USING THE SAME

This application makes reference to and claims all benefits from an application entitled TILT TYPE SLIDING MODULE FOR MOBILE PHONE AND TERMINAL HOLDER USING THE SAME filed in the Korean Intellectual Property Office on Dec. 26, 2009 and there duly assigned PCT/KR2009/007816, which in turn claims a priority to an earlier Korean Patent Application No. 10-2009-0011639 filed on Feb. 12, 2009 and Korean Patent Application No. 10-2009-0035266 filed on Apr. 22, 2009.

TECHNICAL FIELD

The present invention relates to a tilt-type sliding module for a mobile phone and a terminal holder using the same, and more particularly, to a tilt-type sliding module for a mobile phone, which allows a planar sliding motion through a slider and a frame and at the same time, further allows a tilt motion in a vertical direction through the frame, and a terminal holder using the tilt-type sliding module.

BACKGROUND ART

Mobile phones have been regarded as daily necessities owing to convenience in mobility, and their structures have also been changed variously for users' convenience along with the development of the mobile phones.

Conventionally, bar-type, flip-type, and folder-type mobile phones have been used, but recently, in line with the size-increase trend of mobile phones' liquid crystal screens, sliding-type mobile phones have been widely used where the mobile phones are opened or closed by sliding of their display units.

In recent times, various additional functions, especially, wireless Internet, multimedia, etc., as well as a unique communication function have been provided through mobile phones and widely used. To provide further enhanced structural convenience to mobile phone users, there is a demand for a mobile phone having a tilt-type sliding module, which enables a display unit of the mobile phone to perform not only a planar sliding motion, but also a tilt motion for inclining upwardly.

That is, development and application have been carried out regarding a tilt-type sliding module for a mobile phone, which is capable of achieving a sliding state for providing optimal convenience according to user's intention, such that when a mobile phone user intends to perform a communication over the mobile phone, the mobile phone's display unit performs a planar sliding motion; when the user intends to enjoy multimedia contents, such as wireless Internet, Digital Multimedia Broadcasting (DMB), moving pictures, and so forth, the mobile phone's display unit performs a tilt motion for inclining upwardly.

DETAILED DESCRIPTION OF THE INVENTION

Technical Problem

It is therefore an object of the present invention to provide a tilt-type sliding module for a mobile phone, which enables a display unit of the mobile phone to perform a planar sliding motion and at the same time, to perform a tilt motion for inclining upwardly, thereby providing optimal convenience according to a user's purpose.

It is another object of the present invention to provide a terminal holder using a tilt-type sliding module.

Technical Solution

According to one aspect of the present invention, there is provided a tilt-type sliding module for a mobile phone, which enables a planar sliding motion and a tilt motion of the mobile phone, the tilt-type sliding module including a frame 30 mounted and fixed to an inner side of the mobile phone to generate the planar sliding motion and the tilt motion of the mobile phone; a slider 10 for performing the planar sliding motion by being guided by the frame 30; an elastic device 80 connected to the frame 30 and the slider 10 to generate the planar sliding motion in a semi-automatic manner; a tilt rotation portion 38 formed at each of both-side edges of the frame 30 to generate a rotation motion of the frame 30; a control bracket 40 connected with the tilt rotation portion 38 to guide a stable tilt motion of the tilt rotation portion 38; a spring ball 70 mounted on a side of the tilt rotation portion 38 to generate a stepwise stop motion during the rotation motion of the tilt rotation portion 38 and to maintain a stable tilt state of the tilt rotation portion 38; a plurality of spring ball lock holes 46a and 46b formed on sides of the control bracket 40 to generate an insertion and lock motion by means of an elastic force of the spring ball 70 and a leave motion by means of an external force; a stopper shaft 60 for limiting a maximum tilt rotation angle of the tilt rotation portion 38; a stopper shaft control hole 32 penetrating the tilt rotation portion 38 to generate upper and lower lock motions by means of the stopper shaft 60; a stopper shaft engagement hole 44 formed on both sides of the control bracket 40 to fix the stopper shaft 60; a main shaft 50 for connecting the tilt rotation portion 38 with the control bracket 40 and for serving as a rotation axis of the tilt rotation portion 38; and a main shaft engagement hole 42 formed on the both sides of the control bracket 40 to accommodate the main shaft 50.

According to another aspect of the present invention, there is provided a terminal holder including a support plate 200 longitudinally extending in the shape of a plate; and a bracket 220 coupled with a head portion of the support plate 200, wherein a stopper 201 is formed on a downward-bent portion of the head portion of the support plate 200; the stopper 201 of the support plate is locked in a stopper 222 of the bracket 220; a hole into which a shaft 306 is inserted and a lock hole 206 into which an internal spring 300, an external spring 304, and a spring ball 302 are inserted are formed in the head portion of the support plate 200; the bracket 220, when placed on a bottom surface of the head portion of the support plate 200, is coupled to the support plate 200 to rotate by means of the shaft 201; a spring ball 302 is locked stepwise in two lock holes 224 formed in the bracket 220 by means of tension applied by the internal spring 300 and the external spring 304; the diameter of the lock hole 224 is smaller than that of the spring ball 302; the support plate 200 is coupled with the bracket 200 by means of the shaft 306 to rotate with respect to the shaft 306; and as the support plate 200 is raised up and laid down, the spring ball 302 is locked in the lock hole 224, the lock hole is provided as two or three lock holes, and the terminal holder is installed on a rear side of a mobile phone.

Advantageous Effects

A tilt-type sliding module for a mobile phone according to the present invention enables a display unit of the mobile phone to perform a planar sliding motion and at the same time, to perform a tilt motion for inclining upwardly, thereby implementing a sliding state capable of providing optimal convenience according to a user's purpose.

In addition, the tilt-type sliding module allows a stepwise tilt motion of the display unit of the mobile phone, thereby determining a tilt angle variously according to user's convenience.

Moreover, the tilt-type sliding module limits a maximum tilt angle by means of a stopper shaft and a control hole, thereby preventing the display unit of the mobile phone from performing a tilt rotation motion at random more than needs.

BRIEF DESCRIPTION OF THE DRAWINGS

FIG. 2 is a diagram showing an operating state before a sliding motion of a mobile phone is made;

FIG. 3 is a diagram showing an operating state after a slider completes a planar sliding motion;

FIG. 21 shows side views and rear view illustrating a state where a support plate is raised to its uppermost position when another embodiment of a terminal holder according to a modification of the present invention is assembled;

Description of Symbols of Major Parts of Drawings

| | |
|---|---|
| 10: Slider | 20: Guide Rail |
| 30: Frame | 32: Stopper Shaft Control Hole |
| 34: Main Shaft Rotation Port | 36: Guide Rail Insertion End |
| 38: Tilt Rotation Portion | 40, 90: Control Bracket |
| 42: Main Shaft Engagement Hole | 44: Stopper Shaft Engagement Hole |
| 46a, 46b, 94, 95: Spring Ball Lock Hole | 48: Engagement Plate |
| 50, 100: Main Shaft | 60, 102: Stopper Shaft |
| 70, 110: Spring Ball | 80: Elastic Device |

MODE FOR CARRYING OUT THE INVENTION

A tilt-type sliding module for a mobile phone according to the present invention may allow a planar sliding motion through a slider 10 and a frame 30, and at the same time, further allow a tilt motion in a vertical direction through the frame 30.

A tilt-type sliding module for a mobile phone according to the present invention may include devices having structures using a slide elastic device 80 used in a general slide-type mobile phone, the frame 30 mounted and fixed in the mobile phone, and the slider 10 which performs a sliding motion through the frame 30. More specifically, the tilt-type sliding module generates two motion sections, that is, a planar sliding motion section and a tilt motion section, thereby enabling a display unit of the mobile phone to slide to an upward-tilt position.

The planar sliding motion section means a section where the display unit of the mobile phone linearly moves in parallel with a body of the mobile phone. In the following description, such a motion will be referred to as a 'planar sliding motion'.

The tilt motion section means a section where the display unit of the mobile phone moves to an upward-tilt position by a predetermined angle with respect to the body of the mobile phone. In the following description, such a motion will be referred to as a 'tilt motion'.

Figure 1:
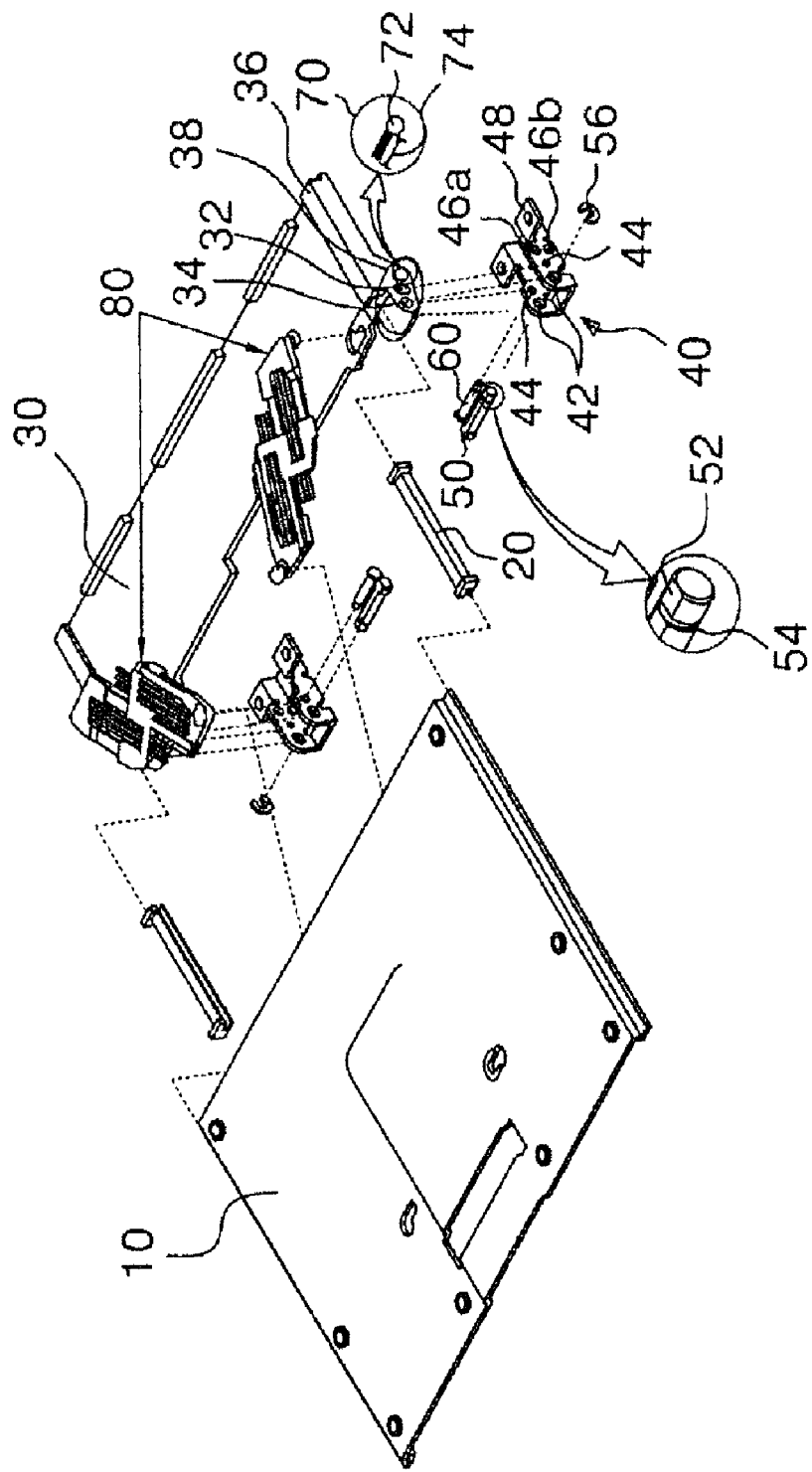
FIG. 1 is an exploded perspective view showing a structure of a tilt-type sliding module for a mobile phone according to the present invention.

FIG. 1 is an exploded perspective view showing a structure of a tilt-type sliding module for a mobile phone according to the present invention.

Referring to FIG. 1, the tilt-type sliding module according to the present invention may include a planar-sliding driving portion and a tilt driving portion.

First, the planar-sliding driving portion will be described in detail.

The planar-sliding driving portion of the tilt-type sliding module according to the present invention may include the frame 30 mounted and fixed in the mobile phone to implement the planar sliding motion and the tilt motion of the mobile phone; guide rails 20 configured to have long grooves in the shape of '⊏' therein for guiding the planar sliding motion of the slider 10; guide rail insertion ends 36 formed by bending both ends of the frame 30 in the shape of '⌐' to accommodate the guide rails 20 in both-side edges of the frame 30; the slider 10 for executing the planar sliding motion of the mobile phone through the guide rails 20; and the slide elastic device 80 for generating the planar sliding motion of the slider 10 by means of a spring tension action.

On the both-side edges of the slider 10 are formed guide pieces configured by bending both ends of the slider 10 in the shape of 'L', respectively, to be inserted in the '⊏'-shape grooves of the guide rails 20 for guiding the sliding motion.

The slide elastic device 80 used for a slide-type mobile phone generally allows a sliding motion of the mobile phone to be generated in a semi-automatic manner by using a restoring force of a spring. At present, a scheme using a torsion spring and a scheme using a coil spring are widely used.

The slide elastic device 80 included in the sliding module according to the present invention may also adopt any one of the torsion spring scheme and the coil spring scheme.

The slide elastic device 80 is a well-known technique, and thus will not be described in detail, and only components thereof necessary for application to the sliding module according to the present invention will be described.

The embodiment shown in FIG. 1 is a sliding module to which the elastic device 80 using the coil spring scheme is applied. As shown in FIG. 1, cylindrical rivets are formed at both ends of the slide elastic device 80, and the slide elastic device 80 rotates in a state where the rivet at one end is inserted into the frame 30 and the rivet at the other end is inserted into the slider 10, thereby allowing the slider 10 to perform a planar sliding motion in an up-and-down direction with respect to the frame 30.

The elastic device 80 is preferably provided as a pair of elastic devices at right and left corners, respectively. However, only one elastic device 80 may be provided.

As mentioned previously, in the tilt-type sliding module according to the present invention, after the planar sliding motion section of the display unit of the mobile phone through the planar-sliding driving portion is completed, the tilt motion of the display unit of the mobile phone is performed.

Hereinafter, the tilt driving portion will be described in detail with reference to FIG. 1.

The tilt driving portion of the tilt-type sliding module according to the present invention basically enables a rotation motion through tilt rotation portions 38 formed on both-side corners of the frame 30, respectively, and a tilt motion of the display unit of the mobile phone through control brackets 40 coupled and fixed to a mobile phone intermediate member for controlling stable rotation and stop motions of the tilt rotation portion 38.

The tilt rotation portions 38 according to the present invention are formed as a pair of tilt rotation portions which protrude from the both-side corners of the frame 30, respectively.

That is, on top sides of edge portions of the frame 30 are formed the guide rail insertion ends 36 and on bottom sides thereof are formed the tilt rotation portions 38.

The tilt rotation portions 38 are insertedly engaged with the control brackets 40 through main shafts 50, thereby achieving a rotation motion with respect to the main shafts 50 and a tilt motion of the display unit of the mobile phone through stop of the rotation motion using spring balls 70.

To implement the rotation motion and the stop motion, each tilt rotation portion 38 according to the present invention has a rotation hole 34 for allowing the main shaft 50 to be through-inserted thereinto; a control hole 32 for allowing a stopper shaft 60 to be through-inserted thereinto; and spring ball lock holes 46a and 46b on which the spring ball 70 for stopping the upward tilt motion of the display unit of the mobile phone in a desired position is insertedly mounted.

The main shaft 50 shown in FIG. 1 according to an embodiment of the present invention is configured to be through-inserted into the rotation hole 34 formed in the tilt rotation portion 38 and to be engaged with a main shaft engagement hole 42 formed in the control bracket 40. Of course, without the main shaft, rotation protrusions for functioning as the main shaft, may protrude from both sides of the tilt rotation portion 38 to be coupled with the engagement hole 42, such that the tilt rotation portion 38 may rotate around the rotation protrusions.

The spring ball 70 according to the present invention includes a load portion 74 including a coil spring and a latch 72 in a spherical shape.

The tilt driving portion according to the present invention causes the latch 72 to be stepwise inserted into and locked in the lock holes 46a and 46b formed in the control bracket 40 by using an elastic restoring force of the load portion 74, thereby allowing the tilt rotation portion 38 to finish stopping its rotation motion in a desired position.

The control bracket 40 according to the present invention may include the main shaft engagement hole 42 for engaging the tilt rotation portion 38 with the control bracket 40 through the main shaft 50; the stopper shaft engagement hole 44 for engaging the stopper shaft 60 with the control bracket 40; the first spring ball lock hole 46a and the second spring ball lock hole 46a for generating the stepwise lock motion of the spring ball 70; and an engagement plate 48 for stably coupling and fixing the control bracket 40 to an intermediate member 90 of the mobile phone.

After the tilt rotation portion 38 is inserted into the control bracket 40, the main shaft 50 is through-inserted into the rotation hole 34 of the tilt rotation portion 38 and the main shaft engagement hole 42 of the control bracket 40, such that the tilt rotation portion 38 and the control bracket 40 are engaged with each other.

The tilt rotation portion 38 engaged with the control bracket 40 performs a rotation motion with respect to the main shaft 50 in the control bracket 40 fixedly coupled to the intermediate member of the mobile phone.

Figure 4:
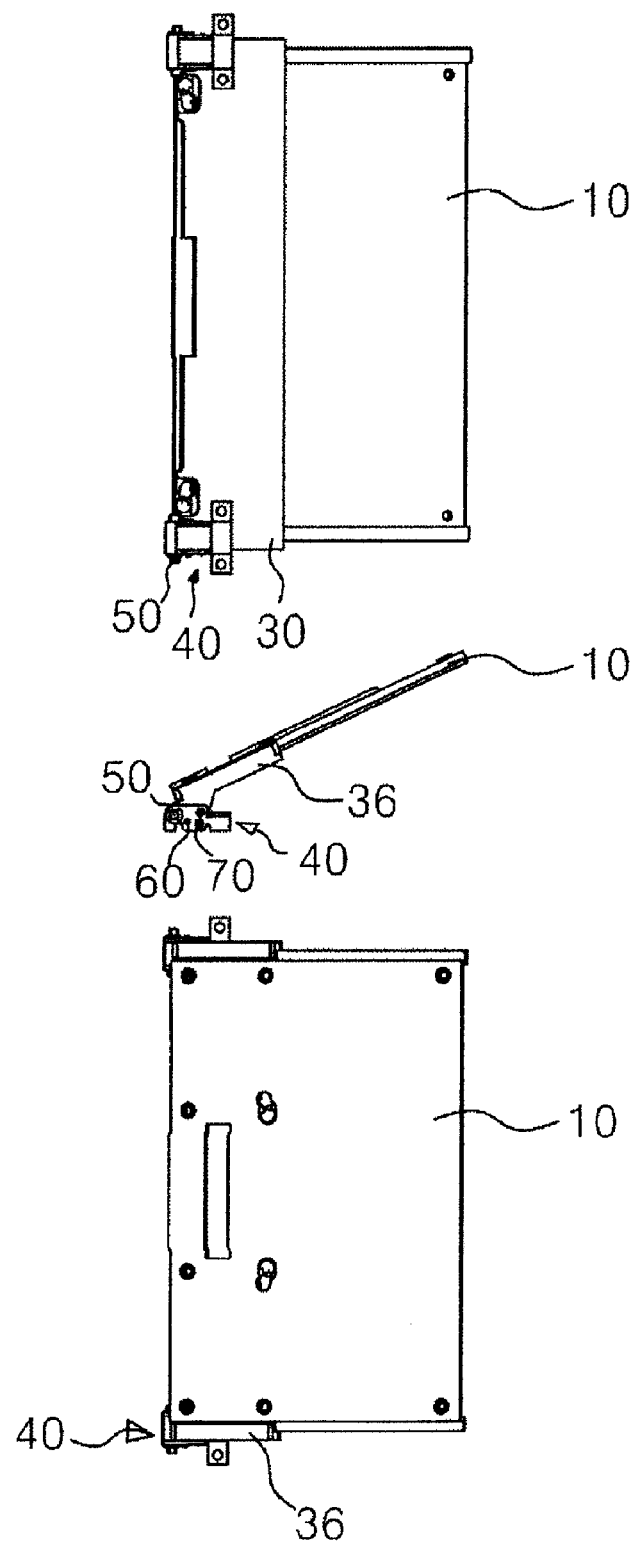
FIG. 4 is a diagram showing an operating state where a frame of a display unit of a mobile phone performs an upward tilt motion together with a slider.
Figure 5A:
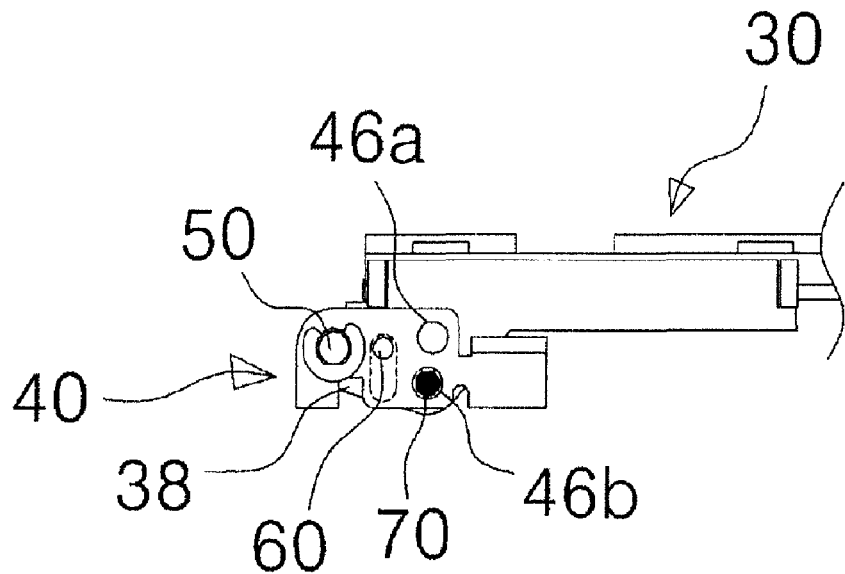
FIG. 5(a) is a partially enlarged diagram showing operating states of a tilt rotating portion 38 and a control bracket in FIGS. 2 and 3.
Figure 5B:
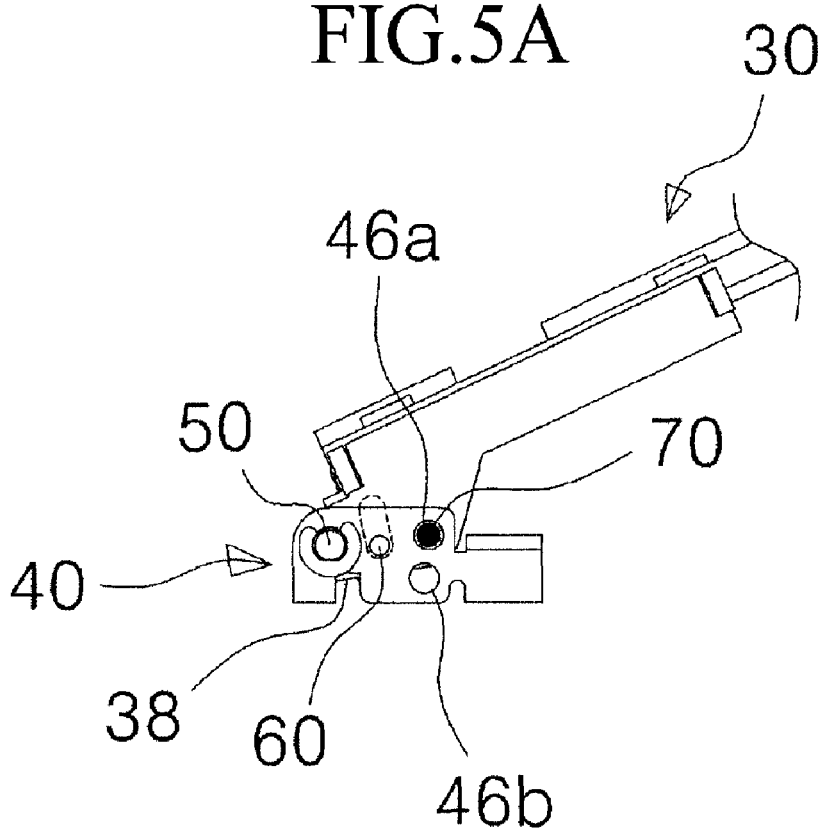
FIG. 5(b) is a partially enlarged diagram showing operating states of a tilt rotating portion 38 and a control bracket in FIG. 4.

FIG. 2 shows an operating state before a mobile phone performs a sliding motion, FIG. 3 shows an operating state after a slider completes a planar sliding motion, and FIG. 4 shows an operating state where a frame of a display unit of a mobile phone performs an upward tilt motion together with the slider. FIG. 5(a) is a partially enlarged diagram showing operating states of the tilt rotating portion 38 and a control bracket in FIGS. 2 and 3, and FIG. 5(b) is a partially enlarged diagram showing operating states of the tilt rotating portion 38 and a control bracket in FIG. 4.

With reference to FIGS. 1 through 5, a detailed description will be made of generation and control schemes of an upward tilt motion through a tilt driving portion according to the present invention.

First, referring to a state prior to generation of the tilt motion by the tilt-type sliding module according to the present invention, that is, a planar sliding section shown in FIGS. 2 and 3, as shown in FIG. 5(a), the spring ball 70 mounted on the frame 30 is inserted into the first lock hole 46b formed in the control bracket 40, thus achieving a first lock motion, whereby the frame 30 stably keeps parallel with the mobile phone body and can perform the planar sliding motion.

After completion of the planar sliding motion, if the user of the mobile phone applies a vertical external force to the slider 10 to implement the upward tilt motion of the display unit of the mobile phone, generation and control of the stable upward tilt motion may occur through the following structural characteristics.

As shown in FIGS. 4 and 5(b), upon application of the external force by the mobile phone's user, the tilt rotation portion 38 protruding from the bottom surface of the frame 30 generates a rotation motion with respect to the main shaft 50 as a reference axis.

Concurrently with generation of the rotation motion of the tilt rotation portion 38, the spring ball 70 mounted on the tilt rotation portion 38 leaves the first lock hole 46b and moves to and is inserted into the second lock hole 46a formed on the upper side of the first lock hole 46b, thus achieving a second lock motion.

Through the second lock motion using the spring ball 70, the mobile phone's user can easily execute the stepwise tilt motion, control the frame 30 to finish stopping its motion in a desired position, and allow the display unit of the mobile phone to stably maintain the upward tilt state.

If an excessively large external force is further applied to the frame 30 in a counterclockwise direction in a final tilt motion completed state of the tilt rotation portion 38 as shown in FIG. 5(b), the spring ball 70 can be prevented from leaving the second lock hole 46a due to the structure of the stopper shaft 60 according to the present invention.

Although two spring ball lock holes 46a and 46b are formed in the tilt rotation portion 38 in the embodiment shown in FIG. 1, additional lock holes may be further formed to allow the spring ball 70 formed in the frame 30 to be further locked stepwise in the additionally formed lock holes, such that the stepwise tilt motion of the frame 30 may be implemented.

If three or more spring ball lock holes are formed, the stepwise tilt motion of the display unit of the mobile phone is possible and a tilt angle may be variously determined according to user's convenience.

The tilt rotation portion 38 and the control bracket 40 formed in the frame 30 according to the present invention are structured such that the stopper shaft 60 is through-inserted into the control hole 32 of the tilt rotation portion 38 and the stopper shaft engagement hole 44 of the control bracket 40, as described above.

The stopper shaft 60 and the control hole 32 according to the present invention are means for limiting a maximum tilt angle of the tilt rotation portion 38, and more specifically, when an excessively large external force is further applied to the frame 30 in a final tilt motion completed state of the tilt rotation portion 38, the stopper shaft 60 and the control hole 32 may prevent the spring ball 70 from leaving the second lock hole 46a.

If the spring ball 70 leaves the second lock hole 46a due to the excessive external force of the mobile phone's user, the display unit of the mobile phone cannot stably maintain its upward tilt state and thus may rotate at random.

Subsequently, to maintain the stable tilt state of the display unit of the mobile phone by preventing the spring ball 70 from leaving the second lock hole 46a, the control hole 32 is formed in an oval shape to penetrate the tilt rotation portion 38 according to the present invention.

In other words, the stopper shaft 60, which is through-inserted into the oval-shape control hole 32 formed in the tilt rotation portion 38 and fixedly engaged with the control bracket 40, contacts the upper side of the control hole 32 when the spring ball 70 is positioned in the first lock hole 46b (i.e., prior to generation of the tilt motion).

Thereafter, once the spring ball 70 leaves the first lock hole 46b and is inserted into the second lock hole 46a by means of the external force of the mobile phone's user, the stopper shaft 60 moves from the upper side to the lower side of the control hole 32 and finally, is locked in the lower side of the control hole 32, such that the tilt rotation portion 38, i.e., the frame 30 is controlled not to rotate any further.

The tilt-type sliding module for the mobile phone according to the present invention controls the display unit of the mobile phone not to rotate more than needs through control of the rotation motion by means of the stopper shaft 60 and the control hole 32, thereby stably maintaining the tilt motion completed state in a desired position.

The main shaft 50 according to the present invention is configured to have the following structural characteristics for preventing the main shaft engagement hole formed in the control bracket 40 from being worn out due to repetitive rotation of the main shaft 50.

In other words, an end portion 52 of the main shaft 50, which is inserted into the engagement hole 42 of the control bracket 40 and outwardly protrudes from the engagement hole 42, has a cross section which is in the shape of a tunnel having a flat top instead of a round top, and the end portion 52 is fixedly inserted into an insertion portion 94 (see FIG. 6) of the intermediate member 90, which has a concave-convex groove in the same shape as the cross-section of the end portion, such that the main shaft 50, when being through-inserted into the control bracket 40, does not rotate and maintains its fixed state and allows the rotation motion of the tilt rotation portion 38.

The main shaft 50 leaves the engagement hole 42 of the control bracket 40 such that a part of a head portion thereof protrudes from the engagement hole 42. A portion of the main shaft 50, that is, the end portion 52 escapes and protrudes from the engagement hole 42 of the control bracket 40, and an insertion groove 54 dented along a circumference of the main shaft 50 is formed in a boundary portion with the engagement hole 42.

A fixing piece 56 having the same width and thickness as the insertion groove 54 is inserted into the insertion groove 54, thereby allowing the main shaft 50 to be fixed without leaving the control bracket. In the present invention, the main shaft 50 may also be fixed to the control bracket 40 by using a well-known means such as soldering, in place of the fixing piece 56.

Figure 6:
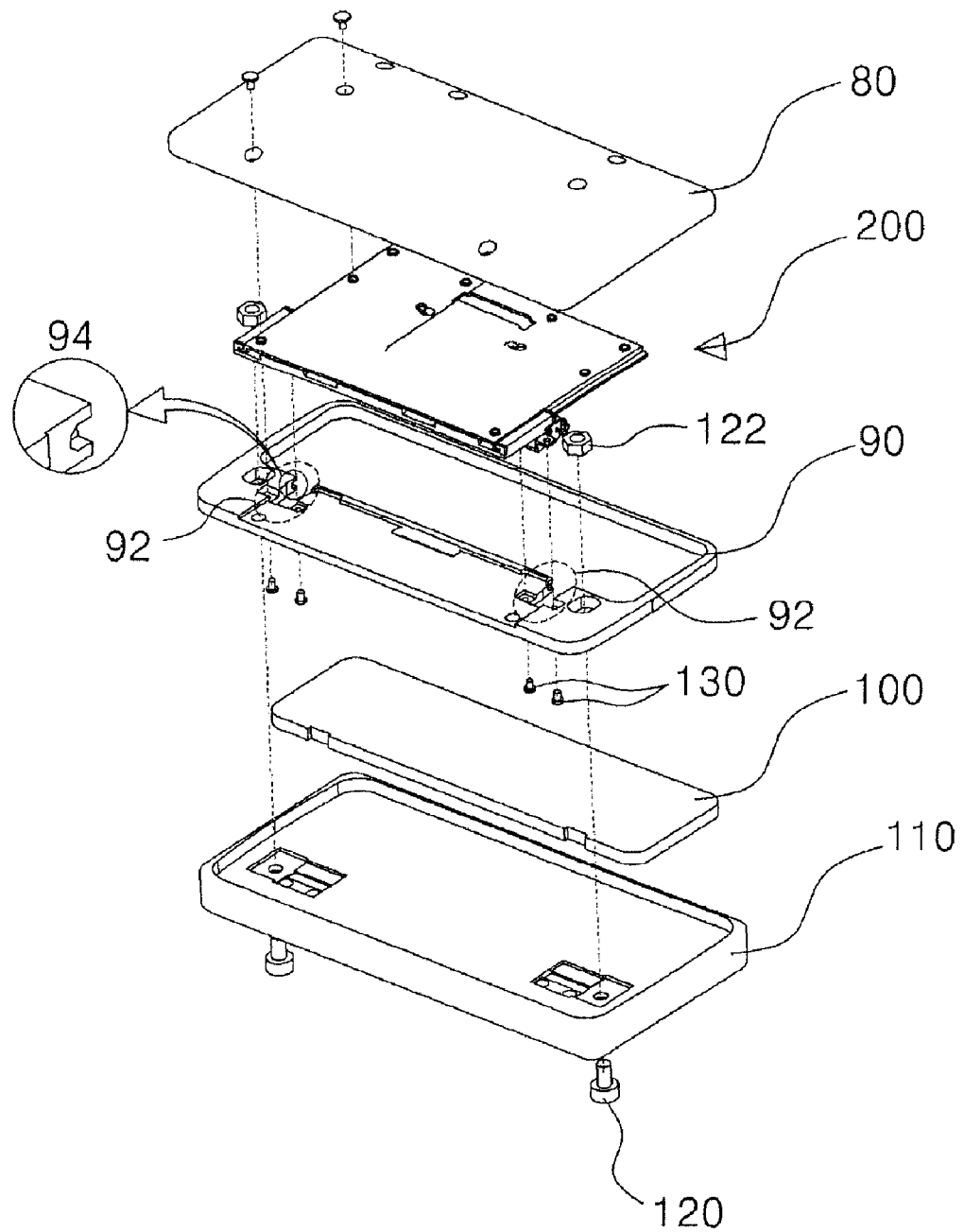
FIG. 6 is an exploded perspective view showing a state where a tilt-type sliding module for a mobile phone according to the present invention is applied to a mobile phone.

FIG. 6 is an exploded perspective view showing a state where a tilt-type sliding module for a mobile phone according to the present invention is applied to a mobile phone.

Referring to FIG. 6, for a mobile phone including a display unit case 80 including a display unit for displaying particular details, such as a liquid crystal display (LCD); a keypad 100 for receiving input of a mobile phone function desired by a user and generating a corresponding electric signal; the intermediate member 90 for stably fixing and coupling a tilt-type sliding module 200 according to the present invention and the keypad 100 to the mobile phone; and a lower case 110 fixedly coupled to the intermediate member 90 to receive a battery, the tilt-type sliding module 200 is coupled to the intermediate member 90 and the display unit case 80 to enable the display unit case 80 to perform a planar sliding motion and a tilt motion.

Hereinafter, a coupling structure for the tilt-type sliding module according to the present invention will be described in more detail.

First, the display unit case 80 is coupled to the slider 10 of the tilt-type sliding module 200 according to the present invention, such that the planar sliding motion by the slider 10 and the tilt motion by the frame 30 are made, thereby providing the sliding or tilt state of the display unit case 80 according to an intention of the mobile phone's user.

The tilt-type sliding module 300 which generates the planar sliding motion and the tilt motion of the display unit case 80 as described above is coupled and fixed to the intermediate member 90.

More specifically, the control bracket 40 and the engagement plate 48 are inserted into a coupling groove 92 formed in the intermediate member 90, such that the coupling groove 92 have a concave-convex groove in a shape formed by the control bracket 40 and the engagement plate 48 formed in the shape of a wing at both widthwise ends of the control bracket 40, that is, a 'T' shape.

In the engagement plate 48 are formed insertion holes for allowing inserted engagement of fixing bolts 130 therewith.

Therefore, the fixing bolts 130 pass through the intermediate member 90 and are insertedly engaged with the insertion holes of the engagement plate 48, such that the control bracket 40 can maintain its state of being stably fixed and coupled to the intermediate member 90.

In the intermediate member 90 according to the present invention is formed the insertion portion 94 having a concave-convex groove in the same shape as the cross-section of the end portion 52 of the main shaft 50 such that the end portion 52 of the main shaft 50 can be fixedly inserted into the insertion portion 94 in the shape of a tunnel having a flat top.

Since the engagement plate 48 for fixedly coupling the control bracket 40 according to the present invention to the concave-convex groove 92 of the intermediate member 90 of the mobile phone is formed, but only at an end portion of the control bracket 48, a fixing force of the control bracket 40 with respect to the intermediate member 90 is weakened after the user makes the tilt motion of the sliding module 200 several tens of thousand times.

To solve the foregoing problem, the end portion 52 of the main shaft 50 outwardly protruding from the control bracket 40, when being inserted into the control bracket 40, is fixedly inserted into the insertion portion 94 of the intermediate member 94 having a concave-convex groove in the same shape as the end portion 52, such that the main shaft 50 allows the control bracket 40 to be firmly fixed to the intermediate member 90. Since the engagement plate 48 of the control bracket 40 and the end portion 52 of the main shaft 50 are fixed together to the intermediate member 90 at front and rear portions, the fixing force of the control bracket 40 with respect to the intermediate member 90 is not easily weakened even though the user makes the tilt motion of the sliding module 200 several tens of thousand times.

The engagement plate 48 of the control bracket 40 fixed to the concave-convex groove 92 of the intermediate member 90 according to the present invention is hidden by the display unit case 80 even when the sliding module 200 is slid and tilt to the maximum, such that the engagement plate 48 is not directly shown to the user.

If another T-shape engagement plate is further installed on a side where the main shaft 50 is positioned to fix the control bracket 40 to the intermediate member 90, instead of fixing the control bracket 40 to the intermediate member 90 by fixedly inserting the main shaft 50 into the insertion portion 94 of the intermediate member 90, pressure may be applied to the keypad 100 during fixing or an inner side of the display unit case 80 may be damaged by a nut 122 during sliding and tilt motions of the sliding module 200. Such a problem can be solved by inserting the main shaft 50 into the insertion portion 94 in the intermediate member 90.

The intermediate member 90 where the tilt-type sliding module 200 according to the present invention is mounted is fixedly coupled to the lower case 110 through engagement between a fixing bolt 120 and the nut 122, as shown in FIG. 6, thereby allowing the planar sliding motion and the tilt motion of the sliding module 200 to be stably performed on the mobile phone.

The tilt-type sliding module according to a second embodiment of the present invention allows the planar sliding motion through the slider 10 and the frame 30, and at the same time, further allows the tilt motion in a vertical direction through the frame 30.

The tilt-type sliding module according to the second embodiment of the present invention includes devices having structures using the slide elastic device 80 used in a general slide-type mobile phone, the frame 30 mounted and fixed in the mobile phone, and the slider 10 which performs a sliding motion through the frame 30. More specifically, the tilt-type sliding module generates two motion sections, that is, a planar sliding motion section and a tilt motion section, thereby enabling a display unit of the mobile phone to slide to an upward-tilt position.

The planar sliding motion section means a section where the display unit of the mobile phone linearly moves in parallel with a body of the mobile phone. In the following description, such a motion will be referred to as a 'planar sliding motion'.

The tilt motion section means a section where the display unit of the mobile phone moves to an upward-tilt position by a predetermined angle with respect to the body of the mobile phone. In the following description, such a motion will be referred to as a 'tilt motion'.

Figure 7:
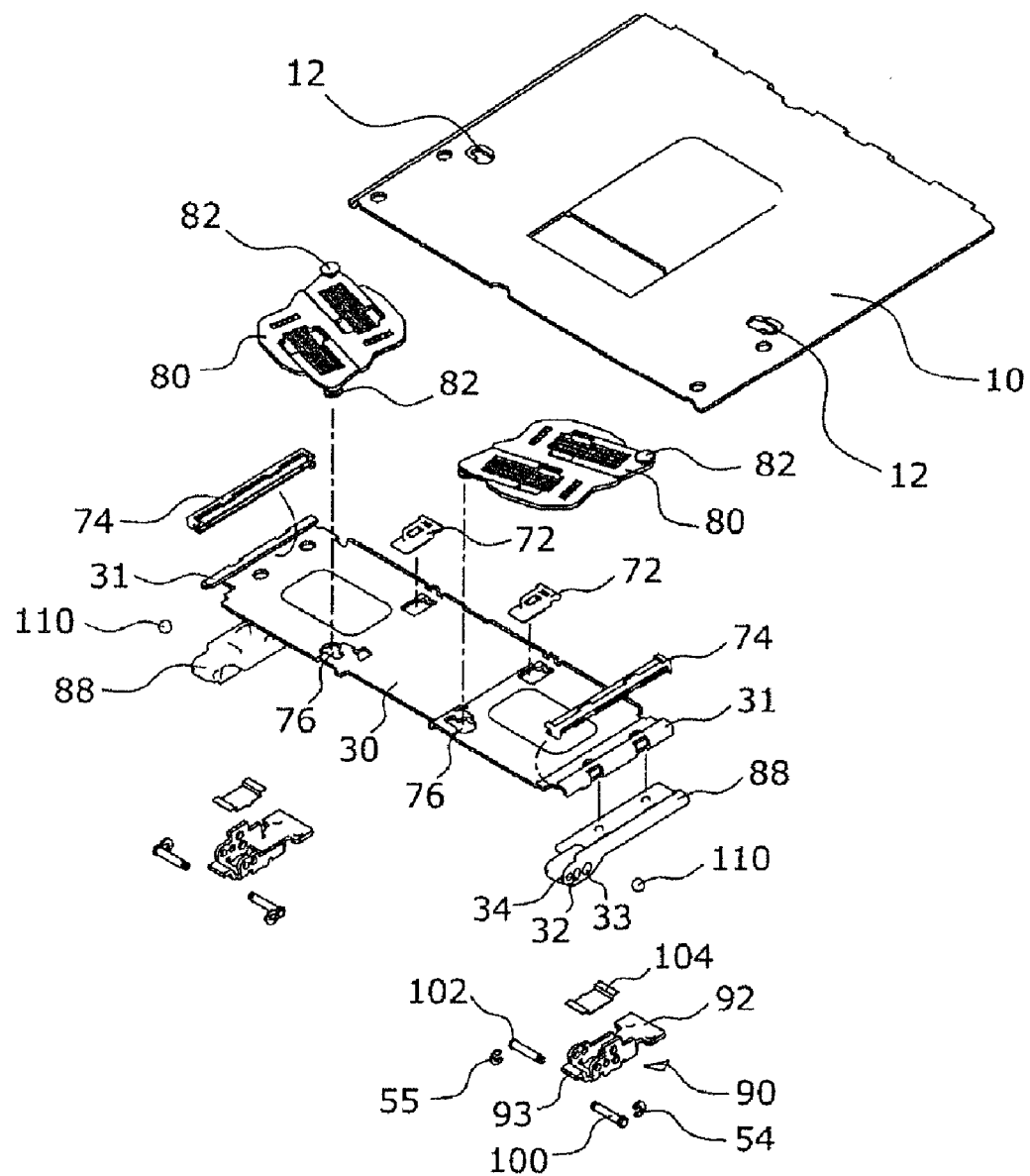
FIGS. 7 and 8 are partially enlarged diagrams showing a structure of a tilt-type sliding module for a mobile phone according to a second embodiment of the present invention.
Figure 8:
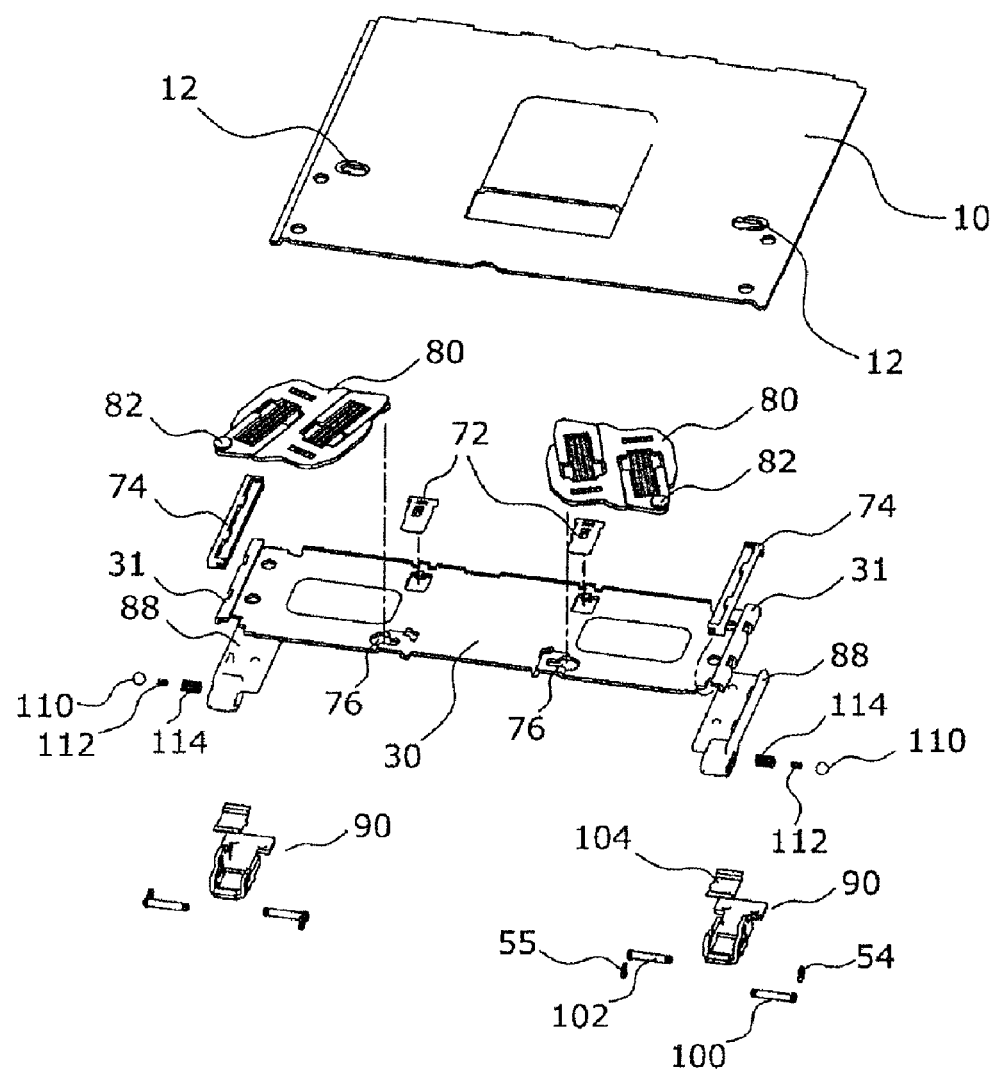

FIGS. 7 and 8 are exploded perspective views showing the tilt-type sliding module for a mobile phone according to the second embodiment of the present invention.

Referring to FIGS. 7 and 8, the tilt-type sliding module according to the second embodiment of the present invention may include a planar-sliding driving portion and a tilt driving portion.

First, the planar-sliding driving portion will be described in detail.

The planar-sliding driving portion of the tilt-type sliding module according to the second embodiment of the present invention may include the frame 30 mounted and fixed in the mobile phone to implement the planar sliding motion and the tilt motion of the mobile phone; guide rails 74 configured to have long grooves in the shape of '⊏' therein for guiding the planar sliding motion of the slider 10; guide rail insertion portions 31 formed by bending both ends of the frame 30 in the shape of '⌐' to accommodate the guide rails 74 in both-side edges of the frame 30; the slider 10 for executing the planar sliding motion of the mobile phone through the guide rails 74; and the slide elastic device 80 for generating the planar sliding motion of the slider 10 by means of a spring tension action.

On the both-side edges of the slider 10 are formed guide pieces configured by bending both ends of the slider 10 in the shape of '⌐', respectively, to be inserted in the '⊏'-shape grooves of the guide rails 74 for guiding the sliding motion.

The slide elastic device 80 used for a slide-type mobile phone generally allows a sliding motion of the mobile phone to be generated in a semi-automatic manner by using a restoring force of a spring. At present, a scheme using a torsion spring and a scheme using a coil spring are widely used.

The slide elastic device 80 included in the sliding module according to the second embodiment of the present invention may also adopt any one of the torsion spring scheme and the coil spring scheme.

The slide elastic device 80 is a well-known technique, and thus will not be described in detail, and only components thereof necessary for application to the sliding module according to the second embodiment of the present invention will be described.

The second embodiment shown in FIGS. 7 and 8 is a sliding module to which the elastic device 80 of the coil spring scheme is applied.

As shown in FIGS. 7 and 8, cylindrical rivets 82 are formed at both ends of the slide elastic device 80, and the slide elastic device 80 rotates in a state where the rivet 82 at one end is inserted into a rivet groove 76 of the frame 30 and the rivet 82 at the other end is inserted into a rivet groove 12 of the slider 10, thereby allowing the slider 10 to perform a planar sliding motion in an up-and-down direction with respect to the frame 30.

The elastic device 80 is preferably provided as a pair of elastic devices at right and left edges, respectively. However, only one elastic device 80 may be provided.

As mentioned previously, in the tilt-type sliding module according to the second embodiment of the present invention, after the planar sliding motion section of the display unit of the mobile phone through the planar-sliding driving portion is completed, the tilt motion of the display unit of the mobile phone is performed.

Figure 9:
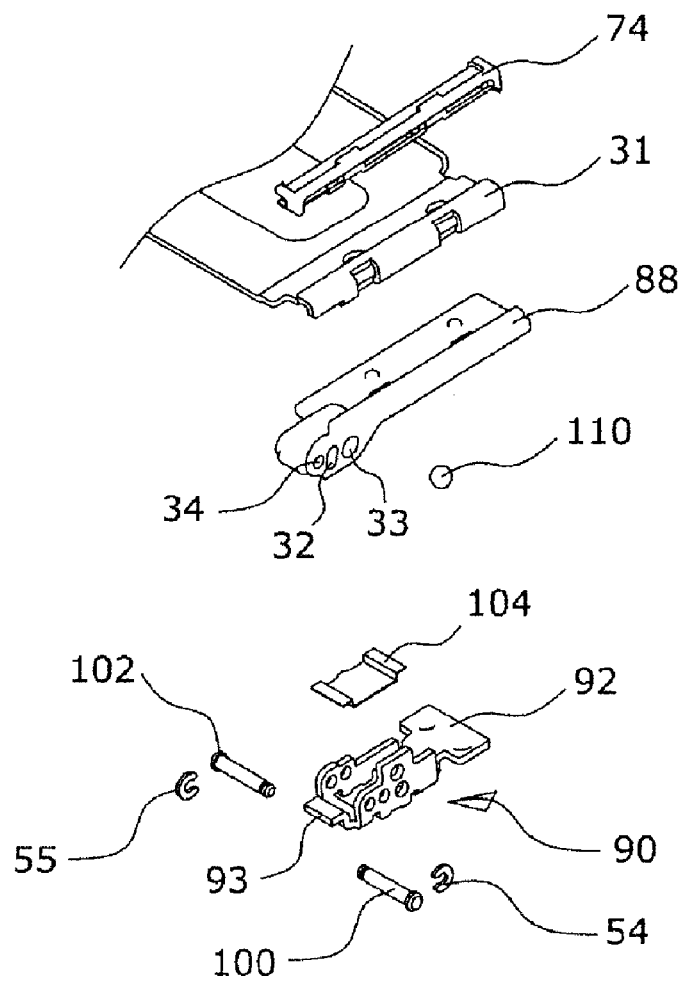
FIG. 9 is an enlarged perspective view of a tilt driving portion according to a second embodiment of the present invention.

FIG. 9 is an enlarged perspective view of the tilt driving portion according to the second embodiment of the present invention.

With reference to FIGS. 7 through 9, the tilt driving portion will be described in detail.

The tilt driving portion of the tilt-type sliding module according to the second embodiment of the present invention basically allows a tilt motion by means of tilt frames 88 formed at both-side edges of the frame 30, respectively, and a tilt motion of the display unit of the mobile phone by means of a control bracket 90 for controlling a stable up-and-down tilt motion and a lock motion of the tilt frame 88.

The tilt frames 88 according to the second embodiment of the present invention are coupled to the frame 30 on bottoms of the both-side edges of the frame 30, respectively, as a pair through laser welding.

The tilt frames 88 according to the second embodiment of the present invention are manufactured by a Metal Injection Mold (MIM) technique. The MIM technique is splitting metals into powder and injecting the powder into a mold. On the other hand, the frame is manufactured by performing press processing on a metal plate of Steel Use Stainless (SUS). The guide rails 74 are made of a material such as synthetic resin POM, and are manufactured by performing insert injection at edges of both ends of the frame 30.

The frame 30, the guide rails 74, and the tilt frames 88 structured and coupled as described above, when dropped from a predetermined height, are not likely to be damaged because the frame 30 is made of a metal plate material which is press-processible, and the manufacturing cost may be reduced because only the tilt frames 88 are manufactured by MIM. When the guide rails 74 and the tilt frames 88 are manufactured as one piece with the frame 30 by injection molding, they are likely to be damaged when being dropped from a predetermined height and the manufacturing cost thereof is increased due to a difficulty in the manufacturing. That is, they are very difficult to manufacture through press processing or injection molding.

According to the second embodiment of the present invention, the guide rails 74 are formed by insert-injection on inner sides of bent surfaces of guide rail insertion portions 31 in the shape of '⊏' on top sides of edges of the frame 30, and the tilt frames 88 separately manufactured by MMI are adhered to bottom sides of the edges of the frame 30 by means of laser welding.

The tilt frames 88 according to the present invention are inserted into and engaged with the control bracket 90, such that the tilt motion of the display unit of the mobile phone is performed through the up-and-down tilt motion with respect to a main shaft 100 and separate stop of the tilt motion using spring balls 110.

To implement the tilt motion according to the present invention, the tilt frame 88 according to the second embodiment of the present invention may include a rotation hole 34 for allowing the main shaft 100 to be through-inserted thereinto; a vertically long oval control hole 32 for allowing a stopper shaft 102 to be through-inserted thereinto; and a spring ball lock hole 33 on which the spring ball 110 for finishing stopping the upward tilt motion of the display unit of the mobile phone in a desired position is insertedly mounted.

The main shaft 100 according to the second embodiment of the present invention is structured such that the tilt frame 88, when engaged with the control bracket 90 under which a protection plate 104 is installed, is also simultaneously engaged with the rotation hole 34 of the tilt frame 88 and a main shaft engagement hole 97 of the control bracket 90, thereby allowing the tilt frame 88 to perform the tilt motion with respect to the main shaft 100.

The protection plate 104 is positioned in an open bottom portion of the control bracket 104, thereby preventing components of the mobile phone, such as a Flexible Printed Circuit Board (FPCB), from contacting the tilt frame 88.

The spring ball 110 according to the second embodiment of the present invention may be fixedly inserted into a spring ball lock hole 33 of the tilt frame 88 together with two coil springs 112 and 114 having different diameters and sizes. Such coil springs 112 and 114 are intended to increase a tension applied by the spring ball 110 to a first lock hole 95 and a second lock hole 94 when the tilt frame 88 is coupled with the control bracket 90 and performs the tilt motion. However, only one coil spring may also be used.

When the spring ball 110 positioned in the spring ball lock hole 33 of the tilt frame 88 is locked in the first lock hole 95 of the control bracket 90 due to the tension applied thereto by the coil springs 112 and 114, once the tilt frame 88 moves upward with respect to the main shaft 100, then the spring ball 110 is locked in the second lock hole 94.

The tilt frame 88 according to the preset invention moves upward with respect to the main shaft 100, when being coupled with the control bracket 90 through the main shaft 100.

A vertical diameter of the control hole 32 according to the present invention has a length such that the tilt frame 88 can move between the first lock hole 95 and the second lock hole 94.

The control bracket 90 according to the second embodiment of the present invention may include the main shaft engagement hole 97 for engaging the tilt frame 88 with the control bracket 90 through the main shaft 100; a stopper shaft engagement hole 96 for engaging the stopper shaft 102 with the control bracket 90; the first spring ball lock hole 95 for generating the stepwise lock motion of the spring ball 110;

and front and rear engagement plates 93 and 92 for stably coupling and fixing the control bracket 90 to the intermediate member 90.

After the tilt frame 88 is inserted into the control bracket 90, the main shaft 100 is through-inserted into the rotation hole 34 of the tilt frame 88 and the main shaft engagement hole 97 of the control bracket 90, such that the tilt frame 88 and the control bracket 90 are engaged with each other.

The tilt frame 88 engaged with the control bracket 90 performs a tilt motion with respect to the main shaft 100 inside the control bracket 90 fixedly coupled to the intermediate member of the mobile phone.

Figures 10A, 10B:
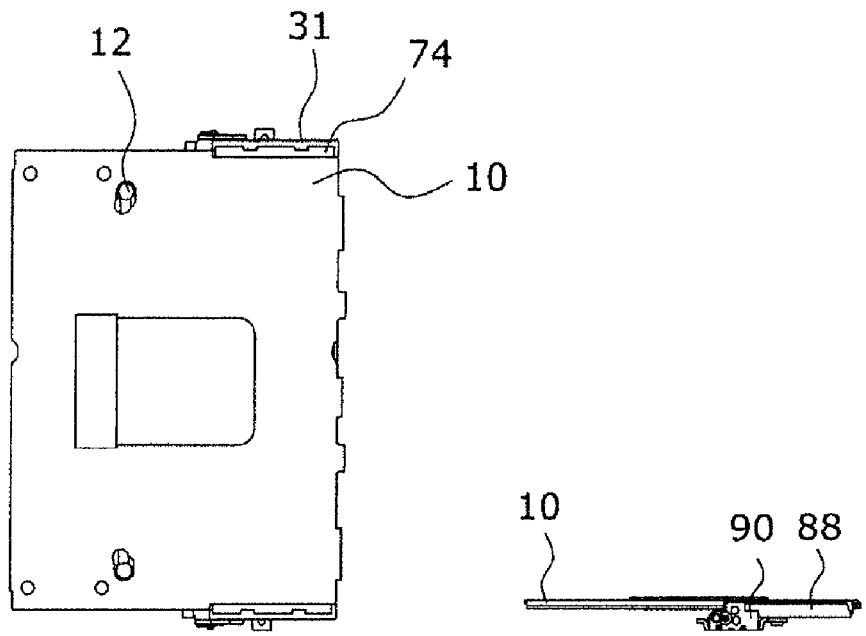
FIGS. 10(a) & (b) shows a state before a sliding motion of a mobile phone is made, and FIGS. 10(c) & (d) shows a state where a sliding motion of a mobile phone progresses to its approximately intermediate state, FIGS. 11 (a) & (b) shows a state after a slider of a mobile phone completes a planar sliding motion, and FIGS. 11 (c) & (d) shows a state where a frame of a display unit of a mobile phone performs an upward tilt motion together with a slider.
Figures 10C, 10D:
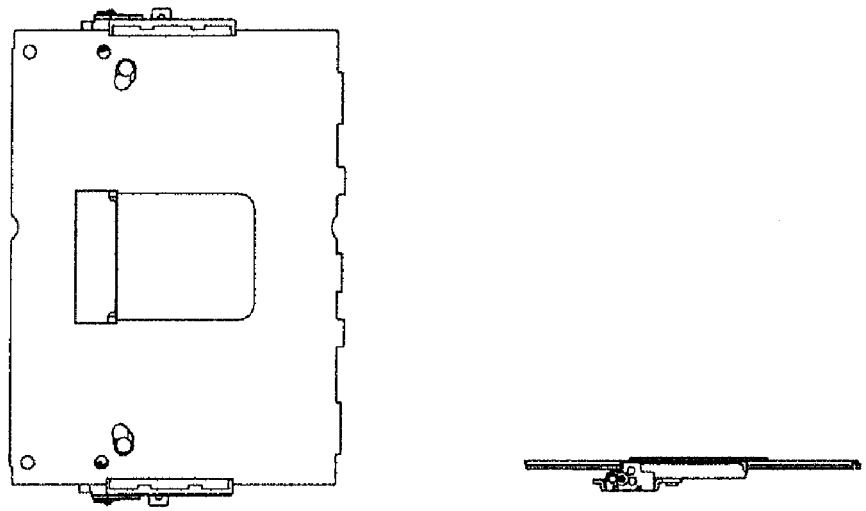
Figure 12A:
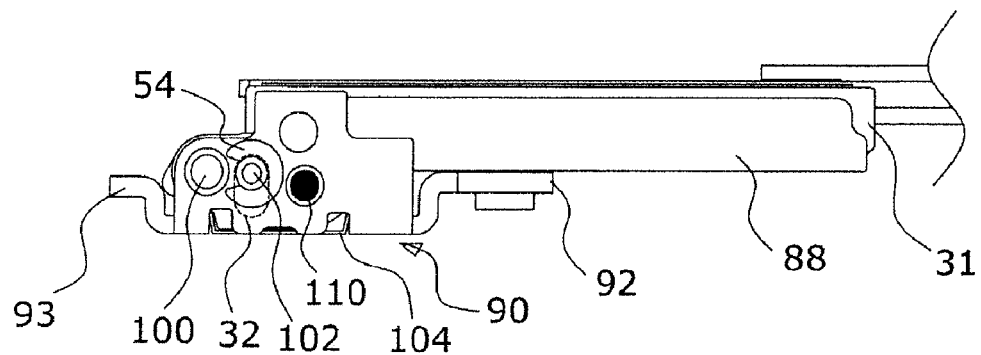
FIGS. 12(a) and 12(b) are partially enlarged diagrams showing operating states of a tilt frame 88 and a control bracket 90 in FIGS. 11(b) and 11(d)
Figure 12B:
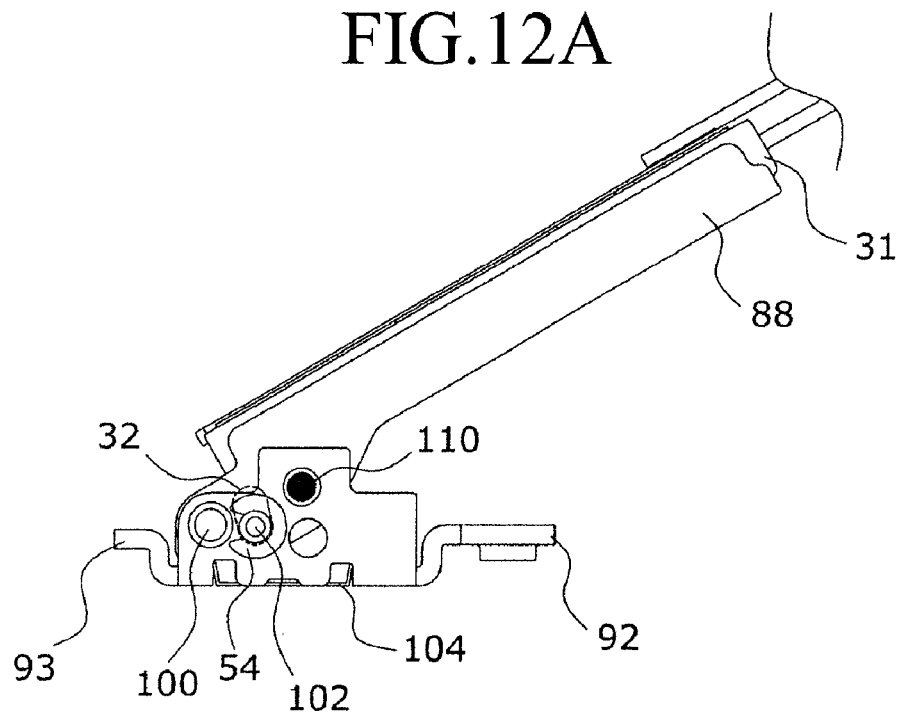

FIGS. 10(*a*) & (*b*) shows a state before a sliding motion of a mobile phone is made, FIGS. 10(*c*) & (*d*) shows a state where a sliding motion of a mobile phone progresses to its approximately intermediate state, FIGS. 11(*a*) & (*b*) shows a state after a slider of a mobile phone completes a planar sliding motion, FIGS. 11(*c*) & (*d*) shows a state where a frame of a display unit of a mobile phone performs an upward tilt motion together with a slider, and FIGS. 12(*a*) and 12(*b*) are partially enlarged diagrams showing operating states of the tilt frame 88 and the control bracket 90 in FIGS. 11(*b*) and 11(*d*).

Referring to FIGS. 10 through 12, a description will be made of generation and control schemes of the upward tilt motion through the tilt driving portion according to the second embodiment of the present invention.

First, referring to a state prior to generation of the tilt motion by the tilt-type sliding module according to the second embodiment of the present invention, that is, a planar sliding section shown in FIG. 10, as shown in FIG. 12(*a*), when the spring ball 110 mounted on the tilt frame 88 is locked in the first lock hole 95 formed in the control bracket 90, the frame 30 stably keeps parallel with the mobile phone body and can perform a planar sliding motion.

After completion of the planar sliding motion, if the user of the mobile phone applies an upward external force to the slider 10 to implement the upward tilt motion of the display unit of the mobile phone, generation and control of the stable upward tilt motion may occur through the following structural characteristics.

Upon application of the external force by the mobile phone's user, the tilt frames 88 coupled to the bottom surfaces of the sides of the frame 30 are tilt upwardly with respect to the main shaft 100 as a central axis.

Concurrently with the tilt motion of the tilt frame 88 in the control bracket 90, the spring ball 110 mounted in the spring ball lock hole 33 of the tilt frame 88 leaves the first lock hole 95 and moves to and is locked in the second lock hole 94 formed on the upper side of the first lock hole 95, thus achieving a second lock motion.

Through the second lock motion using the spring ball 110, the mobile phone's user can easily execute the stepwise tilt motion, control the frame 30 to finishing stopping its motion in a desired position, and allow the display unit of the mobile phone to stably maintain the upward tilt state.

If an excessively large external force is further applied to the frame 30 in a counterclockwise direction in a final tilt motion completed state of the tilt frame 88 as shown in FIG. 11(*d*), the spring ball 110 can be prevented from leaving the second lock hole 94 due to the structure of the stopper shaft 102 according to the second embodiment of the present invention (see FIG. 12).

Although two spring ball lock holes 95 and 94 are formed in the tilt frame 88 according to the second embodiment of the present invention, additional lock holes may be further formed to generate the stepwise lock motion in the frame 30, such that the stepwise tilt motion of the frame 30 may be implemented.

If three or more spring ball lock holes are formed, the stepwise tilt motion of the display unit of the mobile phone is possible and a tilt angle may be variously determined according to user's convenience.

The tilt frame 88 and the control bracket 90 coupled to bottom surfaces of both sides of the frame 30 according to the second embodiment of the present invention are structured such that the stopper shaft 102 is through-inserted into the vertically long oval control hole 32 of the tilt frame 88 and the stopper shaft engagement hole 96 of the control bracket 90, as described above.

Referring to FIG. 12, the stopper shaft 102 and the oval control hole 32 according to the second embodiment of the present invention are means for limiting a maximum tilt angle of the tilt frame 88, and more specifically, when an excessively large external force is further applied to the frame 30 in a final tilt motion completed state of the tilt frame 88, the stopper shaft 102 and the control hole 32 may prevent the spring ball 110 from moving out of a tilt limit range by leaving the second lock hole 94.

If the tilt frame 88 is tilt by the excessively large external force of the mobile phone's user to the extent that the spring ball 110 leaves the second lock hole 94, the display unit of the mobile phone cannot stably maintain the upward tilt state.

Therefore, to prevent the tilt frame 88 from being tilt to the extent that the spring ball 110 leaves the second lock hole 94 and to allow the display unit of the mobile phone to maintain a stable tilt state, the tilt frame 88 according to the second embodiment of the present invention is provided with the oval control hole 32 penetrating through the tilt frame 88.

That is, the stopper shaft 102, which is through-inserted into the oval control hole 32 formed in the tilt frame 88 and fixedly engaged with the control bracket 90, contacts the upper side of the control hole 32 when the spring ball 110 is positioned in the first lock hole 95 (i.e., prior to generation of the tilt motion).

Thereafter, once the tilt frame 88 is pulled by means of the external force of the mobile phone's user such that the spring ball 110 leaves the first lock hole 95 and moves to and is locked in the second lock hole 94, the stopper shaft 102 moves from the upper side to the lower side of the control hole 32 and finally, is locked in the lower side of the control hole 32, whereby the tilt frame 88, i.e., the frame 30 is controlled not to be tilted any further.

The tilt-type sliding module for the mobile phone according to the second embodiment of the present invention controls the display unit of the mobile phone not to be tilted more than needs through control of the tilt range by means of the stopper shaft 102 and the control hole 32, thereby stably maintaining the tilted state in a desired position.

The main shaft 100 and the stopper shaft 102 according to the present invention are fixed by fixing pieces 54 and 55 to prevent the main shaft 100 and the stopper shaft 102 from leaving the control bracket 90. In the second embodiment of the present invention, the main shaft 100 may also be fixed to the control bracket 90 by using a well-known means such as soldering, in place of the fixing pieces 54 and 55.

Figure 13:
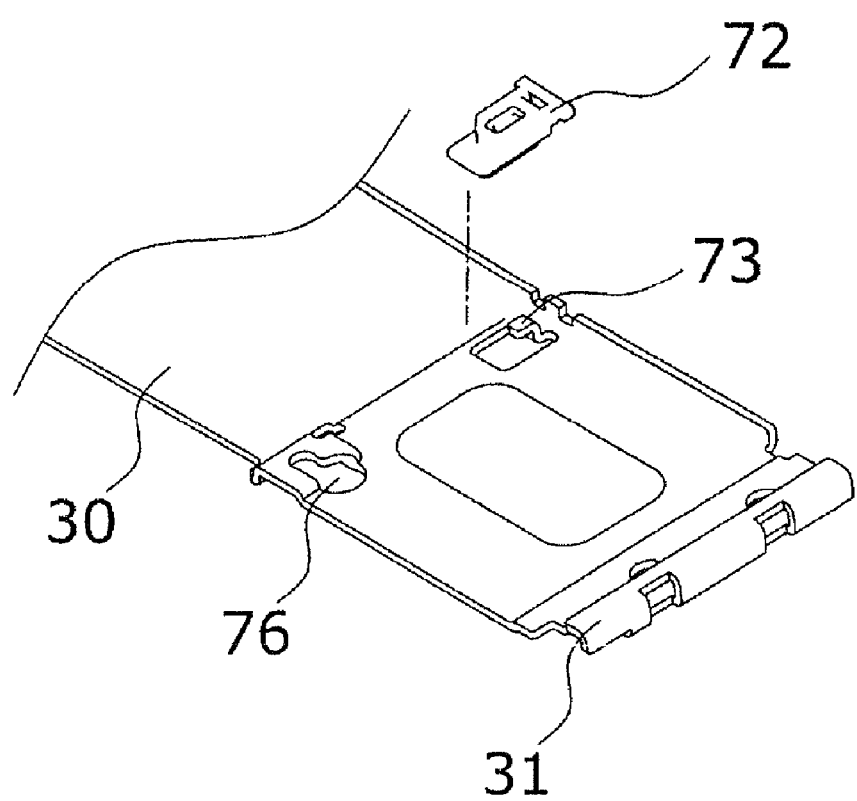
FIG. 13 is a perspective view of a cushion installed on a frame according to a second embodiment of the present invention.
Figure 14:
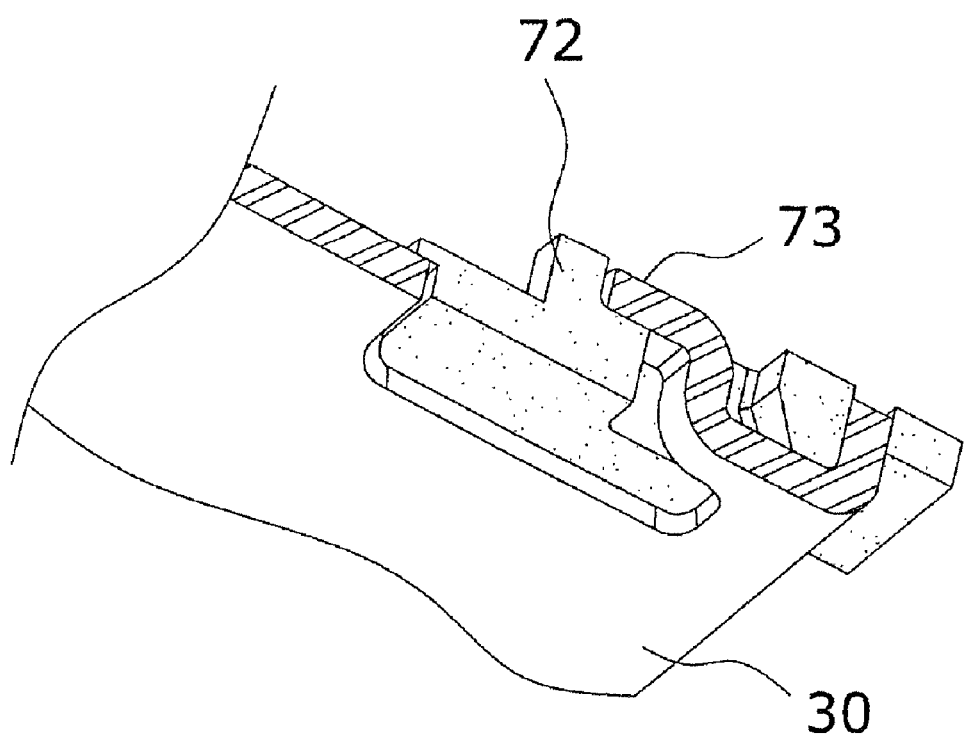
FIG. 14 is a cross-sectional view showing a state where a cushion is installed on a frame according to a second embodiment of the present invention.

FIG. 13 is a perspective view of a cushion installed on a frame according to a second embodiment of the present invention. FIG. 14 is a cross-sectional view showing a state where a cushion is installed on a frame according to a second embodiment of the present invention.

Referring to FIGS. 13 and 14, when a cushion 73 according to the present invention is installed in the frame 30, a cushion fixing protrusion 73 is installed in the frame 30 and the cushion 72 is inserted into the cushion fixing protrusion 73.

The cushion 72 according to the present invention is made of a rubber material which can be transformed, and softens the impact applied to or by the frame 30 during a sliding motion. Shown in FIG. 14 is a cross-sectional view showing a state where the cushion 72 is inserted into the cushion fixing protrusion 73 and a protrusion portion on the rear side of the frame 30. The cushion 72, because of being made of an elastic rubber material, can be inserted into the cushion fixing protrusion 73 by assembler's hand.

The tilt-type sliding module according to the present invention described above may be applied to a terminal holder for holding a terminal such as a mobile phone. A recent terminal such as a mobile phone allows users to view Digital Multimedia Broadcasting (DMB). Accordingly, there is a need for a terminal holder capable of erecting a terminal at a desired angle for viewing of DMB, etc.

Figure 15:
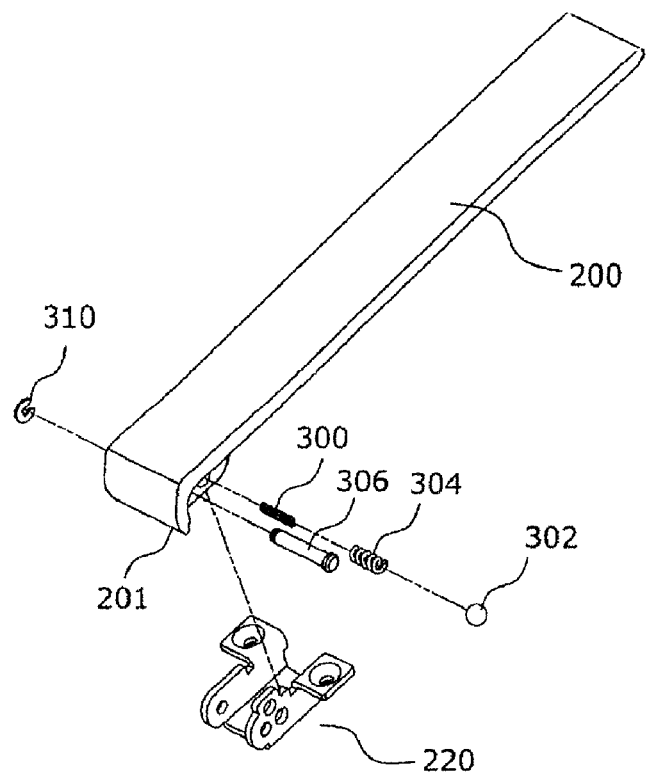
FIG. 15 is an exploded perspective view of a terminal holder according to a modification of the present invention.
Figure 16:
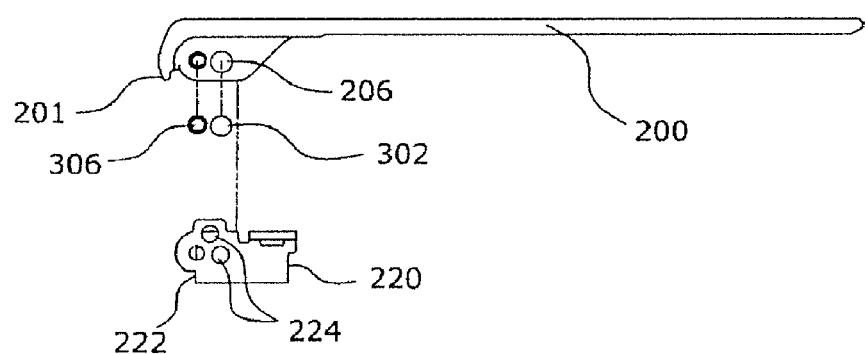
FIG. 16 is an exploded side view of a terminal holder according to a modification of the present invention.

FIG. 15 is an exploded perspective view of a terminal holder according to a modification of the present invention. FIG. 16 is an exploded side view of a terminal holder according to a modification of the present invention.

Referring to FIGS. 15 and 16, the terminal holder according to a modification of the present invention may include a support plate 200 extending longitudinally in the shape of a plate and a bracket 220. A stopper 201 is formed on a downward-bent portion of a head portion of the support plate 200 to be locked in a stopper 222 of the bracket 220. In the head portion of the support plate 200 are formed a hole for insertion of a shaft 306 thereinto and a lock hole 206 for insertion of an internal spring 300, an external spring 304, and a spring ball 302 thereinto.

The bracket 220 according to the present invention, when placed on a bottom surface of the head portion of the support plate 200, is coupled to the support plate 200 to rotate by means of a shaft 201. The spring ball 302 to which the tension is applied by the internal spring 300 and the external spring 304, is locked stepwise in two lock holes 224 formed in the bracket 220. The diameter of each lock hole 224 has to be smaller than that of the spring ball 302.

The support plate 200 according to the present invention is coupled with the bracket 200 through a shaft 306 to rotate with respect to the shaft 306, and when the support plate 200 is raised and laid down, the spring ball 302 is locked in the two lock holes 224.

Figures 17A, 17B, 17C:
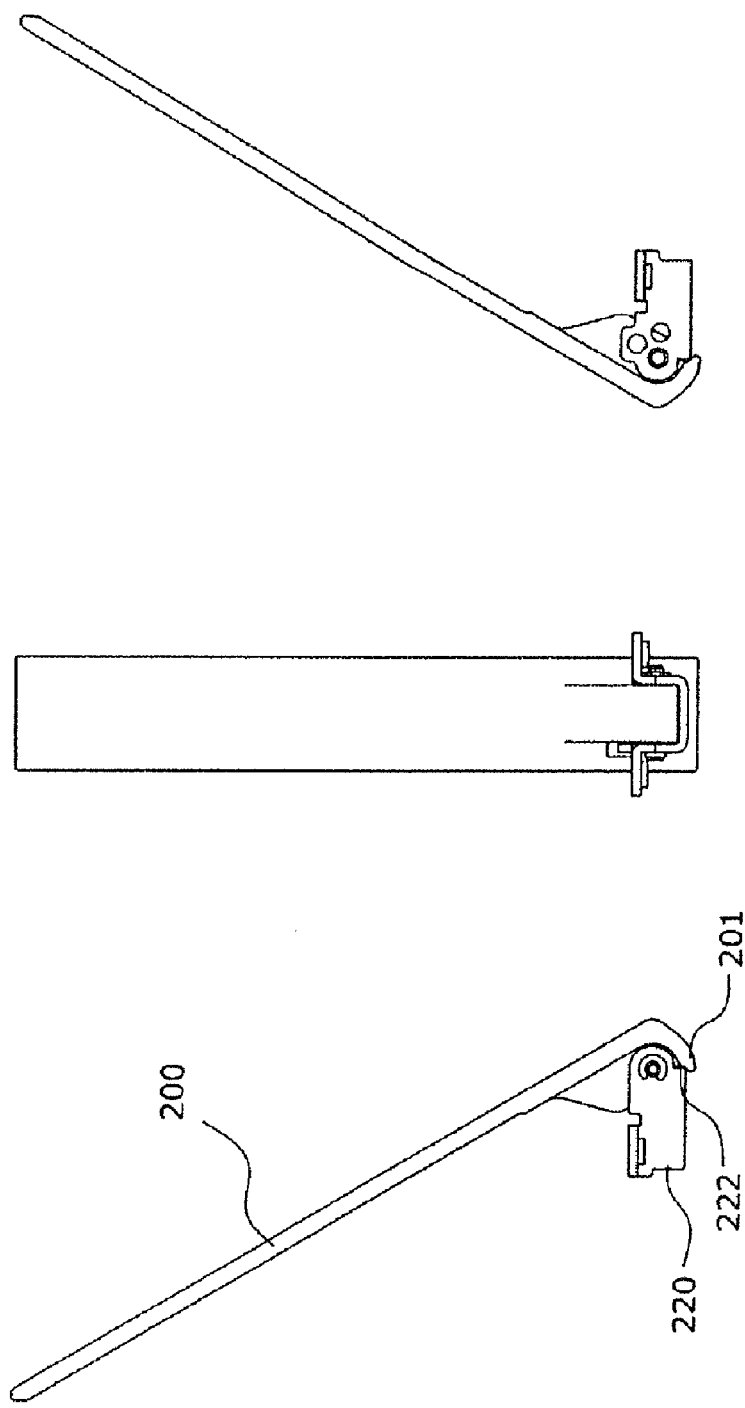
FIG. 17 shows side views and rear view illustrating a state where a support plate is raised when a terminal holder according to a modification of the present invention is assembled.

FIG. 17 shows side views and rear view illustrating a state where a support plate is raised when a terminal holder according to a modification of the present invention is assembled.

Referring to FIG. 17, the support plate 200 is raised up with respect to the shaft 306. The spring ball 302 positioned in the lock hole 206 of the support plate 200 is locked in the upper lock hole 224 among the two lock holes 224 in the bracket 220.

When the support plate 200 is raised up to the maximum, the stopper 201 provided in the head portion of the support plate 200 according to the present invention is supported by the stopper 222 of the bracket 220, such that the support plate 200 is supported by the bracket 200 without moving upwardly any further.

Figures 18A, 18B, 18C:
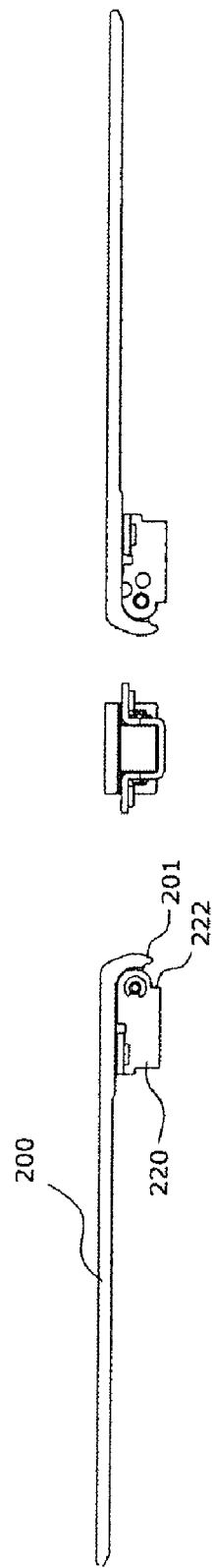
FIG. 18 shows side views and rear view illustrating a state where a support plate is laid down when a terminal holder according to a modification of the present invention is assembled.

FIG. 18 shows side views and rear view illustrating a state where a support plate is laid down when a terminal holder according to a modification of the present invention is assembled.

Referring to FIG. 18, the support plate 200 is laid down with respect to the shaft 306. The spring ball 302 positioned in the lock hole 206 of the support plate 200 is locked in the lower lock hole 224 among the two lock holes 224 in the bracket 220.

Figure 19:
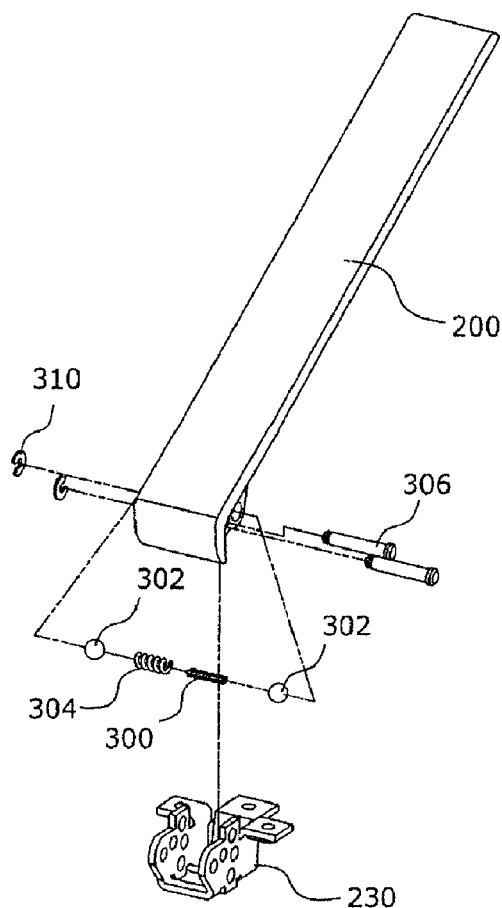
FIG. 19 is an exploded perspective view of another embodiment of a support holder according to a modification of the present invention.
Figure 20:
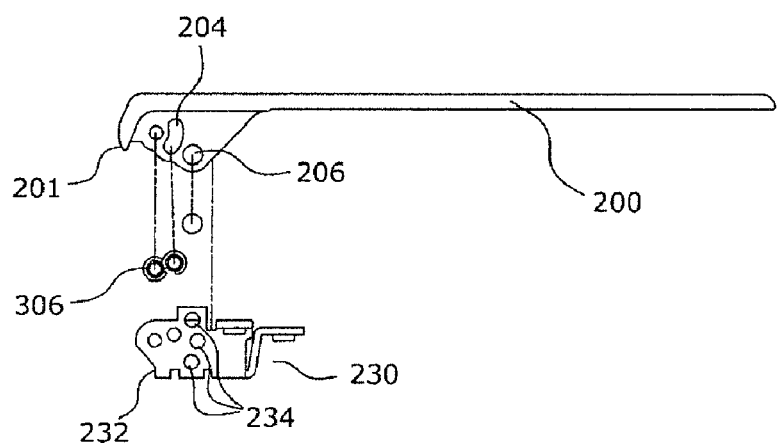
FIG. 20 is an exploded side view of another embodiment of a support holder according to a modification of the present invention.

FIG. 19 is an exploded perspective view of another embodiment of a support holder according to a modification of the present invention. FIG. 20 is an exploded side view of another embodiment of a support holder according to a modification of the present invention.

Referring to FIGS. 19 and 20, the terminal holder according to a modification of the present invention may include the longitudinally extending support plate 200 in the shape of a plate and a bracket 230. The stopper 201 is formed on a downward-bent portion of a head portion of the support plate 200 to be locked in a stopper 232 of the bracket 230. In the head portion of the support plate 200 are formed a hole for insertion of the shaft 306 thereinto, a control hole 204 for limiting a rotation range of the support plate 200, and the lock hole 206 for allowing the internal spring 300 having a large diameter, the external spring 304 having a small diameter, thus being inserted into the internal spring 300, and the spring ball 302 to be inserted thereinto.

The bracket 230 according to the present invention, when placed on a bottom surface of the head portion of the support plate 200, is coupled to the support plate 200 to rotate by means of the shaft 201. As the support plate 200 is raised up and laid down, the spring ball 302 to which the tension is applied by the internal spring 300 and the external spring 304, is locked stepwise in three lock holes 234 formed in the bracket 230. The diameter of each lock hole 224 has to be smaller than that of the spring ball 302.

The support plate 200 according to the present invention is coupled with the bracket 230 through the shaft 306 to rotate with respect to the shaft 306, and when the support plate 200 is raised and laid down with respect to the shaft 306, the spring ball 302 is locked in the three lock holes 224.

Another shaft 306 may extend across the bracket 230 and the control hole 204. Through such a structure, when the support plate 200 is completely folded upwardly, the stopper 201 of the support plate 200 and the stopper 232 of the bracket 230 support each other, and in addition, the shaft 306 fixedly inserted into the bracket 232 inserted into the control hole 204 allows the support plate 200 to rotate a distance limited by the control hole 204, such that in spite of an upward force further applied to the support plate 200, the support plate 200 can be prevented from moving out of a rotation limit range.

FIG. 21 shows side views and rear view illustrating a state where a support plate is raised to its uppermost position when another embodiment of a terminal holder according to a modification of the present invention is assembled.

Referring to FIG. 21, the support plate 200 is raised up to the maximum with respect to the shaft 306. The spring ball 302 positioned in the lock hole 206 of the support plate 200 is locked in the uppermost lock hole 234 among the three lock holes 234 in the bracket 230.

When the support plate 200 is raised up to the maximum, the stopper 201 in the head portion of the support plate 200 according to the present invention is supported by the stopper 232 of the bracket 230, such that the support plate 200 is supported by the bracket 200 without moving upwardly any further.

By means of the shaft 306 fixedly inserted into the bracket 230 and inserted into the control hole 204, the support plate 200 is also prevented from being raised beyond the stopper 232 of the bracket 230.

Figures 22A, 22B, 22C:
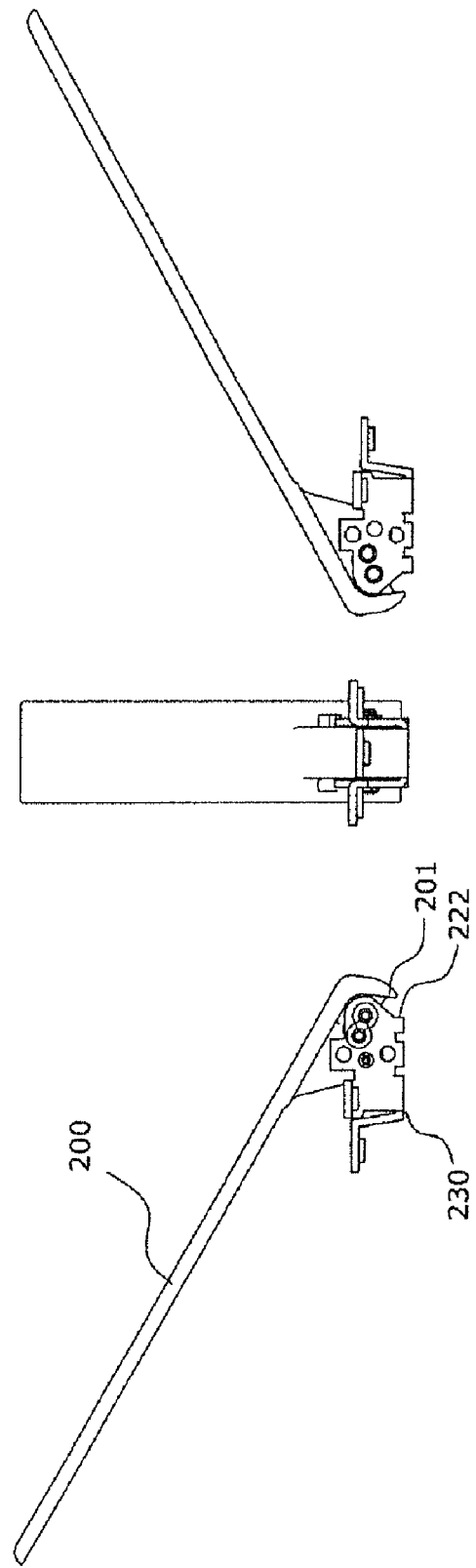
FIG. 22 shows side views and rear view illustrating a state where a support plate is raised to its intermediate position when another embodiment of a terminal holder according to a modification of the present invention is assembled.

FIG. 22 shows side views and rear view illustrating a state where a support plate is raised to its intermediate position when another embodiment of a terminal holder according to a modification of the present invention is assembled.

Referring to FIG. 22, the support plate 200 is raised to its intermediate position with respect to the shaft 306. The spring ball 302 positioned in the lock hole 206 of the support plate 200 is locked in the middle lock hole 234 in the bracket 230.

Figures 23A, 23B, 23C:
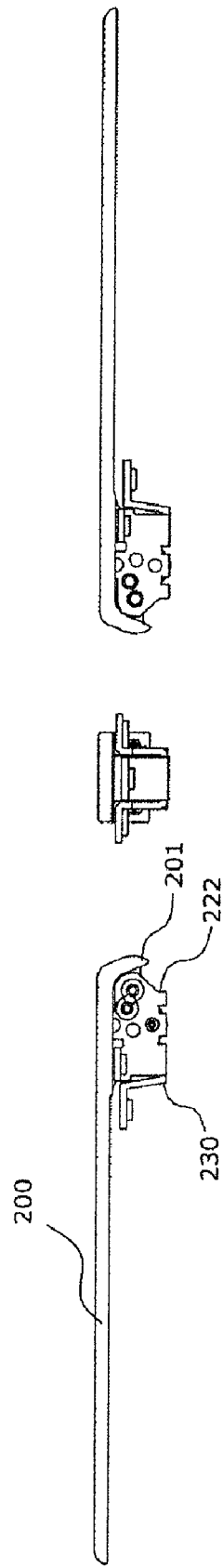
FIG. 23 shows side views and rear view illustrating a state where a support plate is laid to its lowermost position when another embodiment of a terminal holder according to a modification of the present invention is assembled.

FIG. 23 shows side views and rear view illustrating a state where a support plate is laid to its lowermost position when another embodiment of a terminal holder according to a modification of the present invention is assembled.

Referring to FIG. 23, the support plate 200 is laid down to its lowermost position with respect to the shaft 306. The spring ball 302 positioned in the lock hole 206 of the support plate 200 is locked in the lower lock hole 224 in the bracket 230.

FIGS. 24 through 27 show exemplary diagrams illustrating a state where a terminal holder according to the present invention is attached to a terminal.

Figure 24:
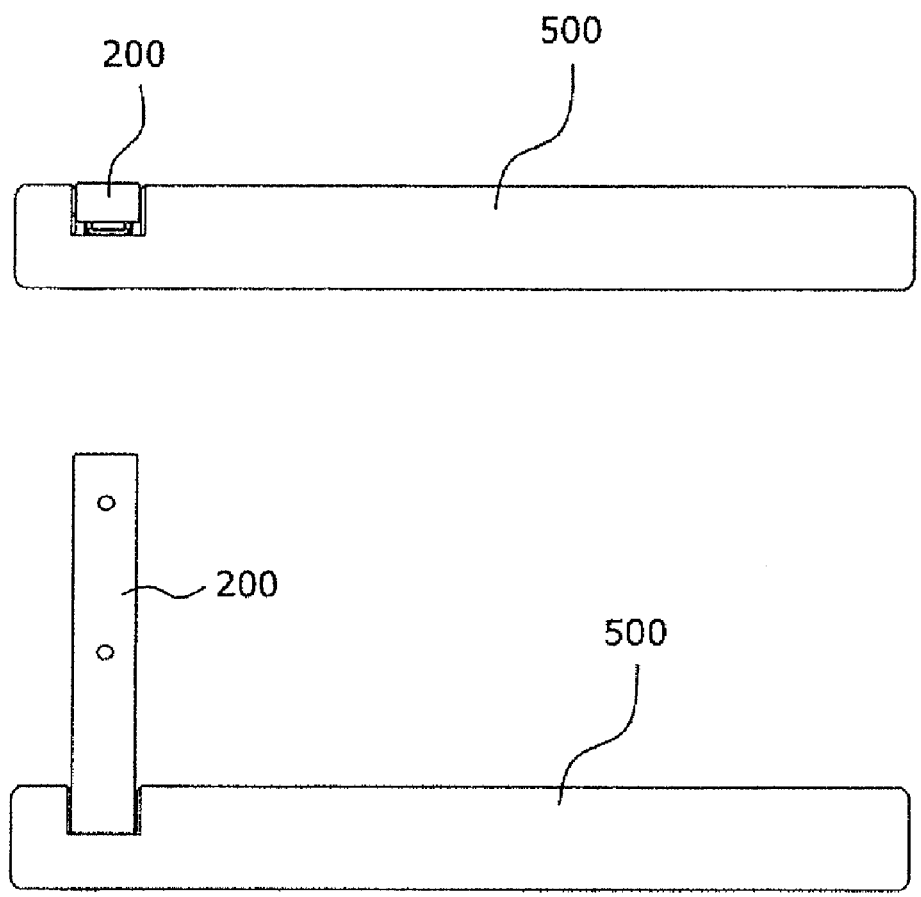
FIGS. 24 through 27 are exemplary diagrams showing a state where a terminal holder according to the present invention is attached to a terminal.

Referring to FIG. 24, the terminal holder including the support plate 200 and the brackets 220 and 230 is attached to a portion of a terminal such as a mobile phone.

FIG. 24(a) shows a terminal 500 having attached thereto the terminal holder, viewed from top, in which the support plate 200 is folded on the surface of the terminal 500. FIG. 24(b) shows a state viewed from top in which the support plate 200 is folded up (or open).

Figures 25A, 25B:
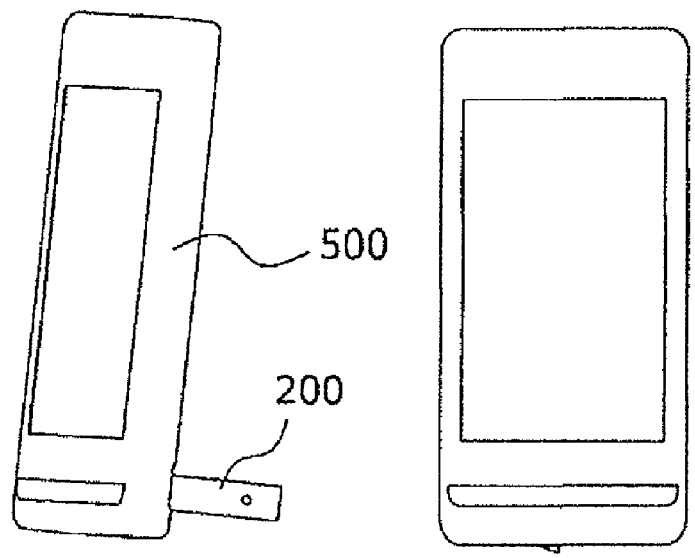
Figures 25C, 25D:
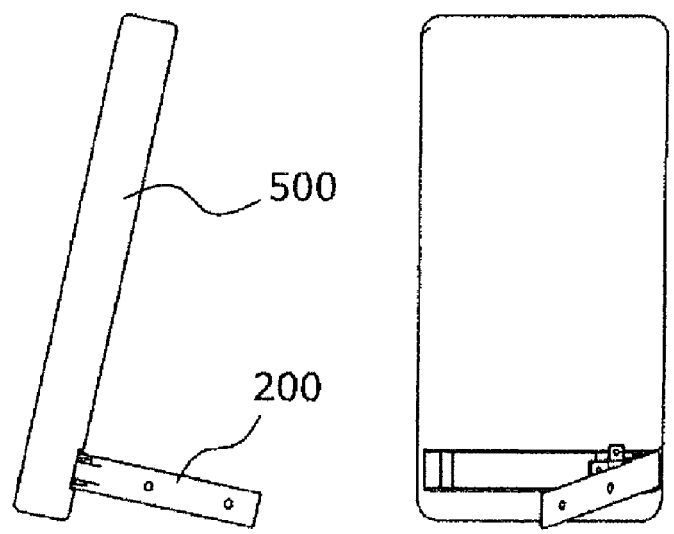
Figure 26A:
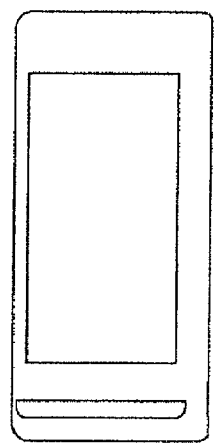
Figure 26B:
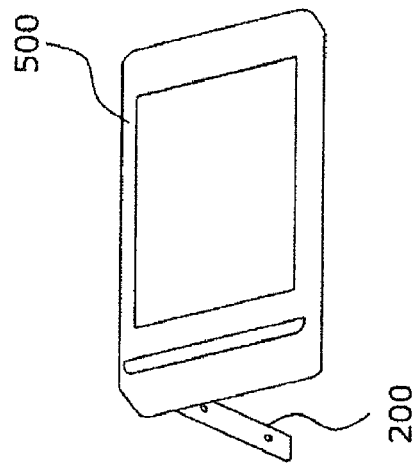
Figure 26C:
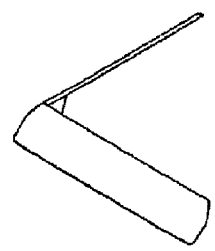
Figure 26D:
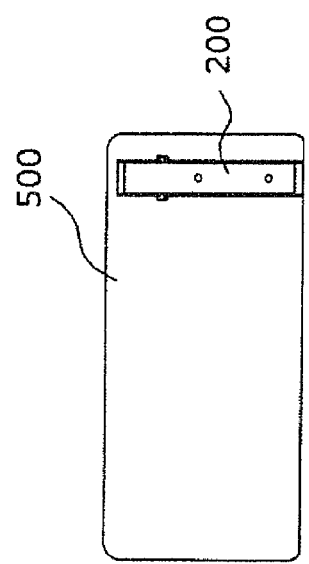
Figure 27A:
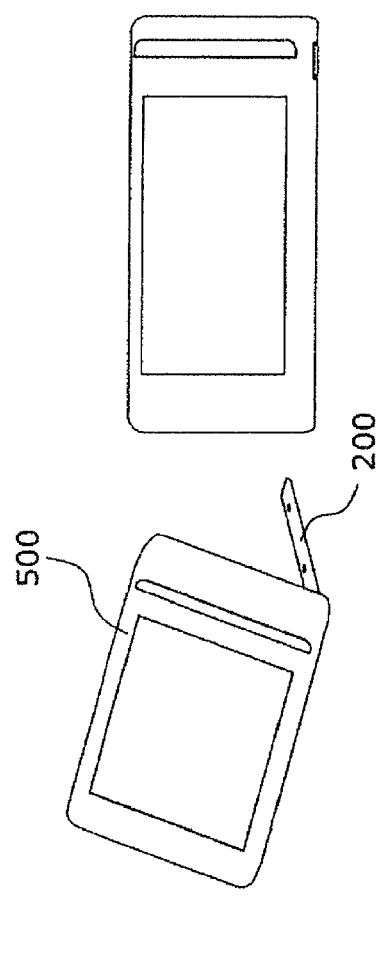
Figure 27B:
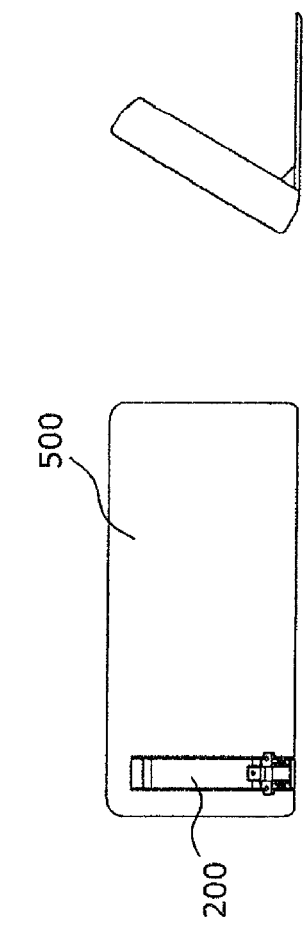
Figure 27C:
Figure 27D:

FIG. 25(a) is a generally side view (a partially front view) showing a state in which the terminal 500 is erected by the support plate 200, FIG. 25(b) shows the terminal 500 viewed from front, FIG. 25(c) is a side view showing a state where the terminal 500 is erected, and FIG. 25(d) is a rear view showing that state.

FIGS. 26 and 27 are perspective views, front views, side views, and rear views showing a state where the terminal holder is installed in a left upper portion of the terminal 500 and a state where the terminal holder is installed in a right lower portion of the terminal 500, respectively.

By installing the terminal holder according to a modification of the present invention in a terminal such as a mobile phone, the user can conveniently and continuously view DMB without holding the terminal by hand.

Industrial Applicability

While the embodiments of the present invention have been described using specific terms, such a description is merely intended for illustration and it should be understood that various changes and modifications can be made without departing from the technical spirit and scope of the appended claims.

What is claimed is:

1. A tilt-type sliding module for a mobile phone, which enables a planar sliding motion and a tilt motion of the mobile phone, the tilt-type sliding module comprising:
  a frame mounted and fixed to an inner side of the mobile phone to generate the planar sliding motion and the tilt motion of the mobile phone;
  a slider for performing the planar sliding motion by being guided by the frame 30;
  an elastic device connected to the frame and the slider to generate the planar sliding motion in a semi-automatic manner;
  a tilt rotation portion formed at each of both-side edges of the frame to generate a rotation motion of the frame;
  a control bracket connected with the tilt rotation portion to guide a stable tilt motion of the tilt rotation portion;
  a spring ball mounted on a side of the tilt rotation portion to generate a stepwise stop motion during the rotation motion of the tilt rotation portion and to maintain a stable tilt state of the tilt rotation portion;
  a plurality of spring ball lock holes formed on sides of the control bracket to generate an insertion and lock motion by means of an elastic force of the spring ball and a leave motion by means of an external force;
  a stopper shaft for limiting a maximum tilt rotation angle of the tilt rotation portion 38;
  a stopper shaft control hole penetrating the tilt rotation portion to generate upper and lower lock motions by means of the stopper shaft;
  a stopper shaft engagement hole 44 formed on both sides of the control bracket to fix the stopper shaft;
  a main shaft for connecting the tilt rotation portion with the control bracket and for serving as a rotation axis of the tilt rotation portion; and
  a main shaft engagement hole formed on the both sides of the control bracket to accommodate the main shaft.

2. The tilt-type sliding module of claim 1, wherein the main shaft is through-inserted into the rotation hole penetrating the tilt rotation portion to connect the tilt rotation portion with the control bracket, and
  an end portion of the main shaft has a cross section which is in a polygonal shape rather than a round shape.

3. The tilt-type sliding module of claim 1, wherein the slider performs the planar sliding motion by means of:
  a guide rail having a vertically long groove in the shape 'ㄷ' of therein to guide the planar sliding motion of the slider; and
  a guide rail insertion end formed by bending both ends of the frame in the shape of 'ㄱ' to accommodate the guide rail in the both-side edges of the frame.

4. The tilt-type sliding module of claim 1, wherein at both widthwise ends of the control bracket is formed an engagement plate in the shape of a wing, and in the engagement plate is formed an insertion hole for allowing a fixing bolt to be inserted thereinto and engaged therewith.

5. The tilt-type sliding module of claim 1, wherein an insertion groove dented along a circumference of the main shaft is formed in a region of the main shaft escaping and protruding from the main shaft engagement hole, and
  a fixing piece having the same width and thickness as the insertion groove is inserted into the insertion groove to enable the main shaft to be fixed in the control bracket without leaving the control bracket.

6. The tilt-type sliding module of claim 1, wherein the spring ball comprises a load portion composed of a coil spring to generate an elastic restoring force and a latch formed in a spherical shape.

7. A tilt-type sliding module for a mobile phone, which enables a planar sliding motion and a tilt motion of the mobile phone, the tilt-type sliding module comprising:
  a frame mounted and fixed to an inner side of the mobile phone to generate the planar sliding motion and the tilt motion of the mobile phone;
  a slider for performing the planar sliding motion by being guided by the frame 30;
  an elastic device connected to the frame and the slider to generate the planar sliding motion in a semi-automatic manner;
  a tilt frame formed at each of both-side edges of the frame to generate the tilt motion of the frame;
  a control bracket connected with the tilt frame to guide a stable tilt motion of the tilt frame;

a spring ball mounted on a side of the tilt frame to generate a stepwise stop motion during the rotation motion of the tilt frame and to maintain a stable tilt state of the tilt frame;

a plurality of spring ball lock holes formed on sides of the control bracket to generate an insertion and lock motion by means of an elastic force of the spring ball and a leave motion by means of an external force;

a stopper shaft for limiting a maximum tilt rotation angle of the tilt frame;

a vertically long oval stopper shaft control hole penetrating the tilt frame to generate upper and lower lock motions by means of the stopper shaft;

a stopper shaft engagement hole formed on both sides of the control bracket to fix the stopper shaft;

a main shaft for connecting the tilt frame with the control bracket and for serving as a rotation axis of the tilt frame; and a main shaft engagement hole formed on the both sides of the control bracket to accommodate the main shaft.

8. The tilt-type sliding module of claim 7, wherein a guide rail is formed on both sides of the frame through insert molding.

9. The tilt-type sliding module of claim 7, wherein a protruding cushion fixing protrusion into which a cushion is inserted is formed on the frame, and the cushion made of a rubber material is inserted into the cushion fixing protrusion.

10. The tilt-type sliding module of claim 7, wherein the spring ball maintains its tension by means of one or more springs.

11. The tilt-type sliding module of claim 7, wherein the frame is manufactured by means of press processing, and the tilt frame is manufactured by metal molding injection.

12. A terminal holder comprising:

a support plate longitudinally extending in the shape of a plate; and a bracket coupled with a head portion of the support plate, wherein a stopper is formed on a downward-bent portion of the head portion of the support plate, the stopper of the support plate is locked in a stopper of the bracket, a hole into which a shaft is inserted and a lock hole into which an internal spring, an external spring, and a spring ball are inserted are formed in the head portion of the support plate, the bracket, when placed on a bottom surface of the head portion of the support plate, is coupled to the support plate to rotate by means of the shaft, a spring ball is locked stepwise in two lock holes formed in the bracket 220 by means of tension applied by the internal spring and the external spring, the diameter of the lock hole is smaller than that of the spring ball, the support plate is coupled with the bracket by means of the shaft to rotate with respect to the shaft, and as the support plate is raised up and laid down, the spring ball is locked in the lock hole.

13. The terminal holder of claim 12, wherein the lock hole is provided as two lock holes.

14. The terminal holder of claim 12, wherein the lock hole is provided as three lock holes.

15. The terminal holder of claim 12, wherein the terminal holder is installed on a rear side of a mobile phone.

\* \* \* \* \*

UNITED STATES PATENT AND TRADEMARK OFFICE
CERTIFICATE OF CORRECTION

PATENT NO.       : 8,238,986 B2
APPLICATION NO.  : 13/146285
DATED            : August 7, 2012
INVENTOR(S)      : Seong-Jun Lee et al.

It is certified that error appears in the above-identified patent and that said Letters Patent is hereby corrected as shown below:

In the Claims:

Column 18, Claim 3, Lines 27-28 should read as follows:
--...in the shape of '⊏' therein ...--

Signed and Sealed this
Eighteenth Day of June, 2013

Teresa Stanek Rea
*Acting Director of the United States Patent and Trademark Office*